(12) United States Patent
Lasseter et al.

(10) Patent No.: US 7,920,942 B2
(45) Date of Patent: Apr. 5, 2011

(54) CONTROL OF COMBINED STORAGE AND GENERATION IN DISTRIBUTED ENERGY RESOURCES

(75) Inventors: Robert H. Lasseter, Madison, WI (US); Paolo Piagi, Cambridge, MA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 970 days.

(21) Appl. No.: 11/681,017

(22) Filed: Mar. 1, 2007

(65) Prior Publication Data

US 2009/0326724 A1    Dec. 31, 2009

(51) Int. Cl.
*G05D 3/12* (2006.01)
(52) U.S. Cl. ......... 700/286; 700/291; 700/295; 323/212
(58) Field of Classification Search .................. 700/286, 700/291, 295, 297, 298; 323/212
See application file for complete search history.

(56) References Cited

U.S. PATENT DOCUMENTS

| | | |
|---|---|---|
| 4,096,394 A | 6/1978 | Ullmann et al. |
| 4,315,163 A | 2/1982 | Bienville |
| 5,041,959 A | 8/1991 | Walker |
| 5,198,698 A | 3/1993 | Paul et al. |
| 5,329,222 A | 7/1994 | Gyugyi et al. |
| 5,536,976 A | 7/1996 | Churchill |
| 5,559,704 A | 9/1996 | Vanek et al. |
| 5,563,802 A | 10/1996 | Plahn et al. |
| 5,596,492 A | 1/1997 | Divan et al. |
| 5,614,770 A | 3/1997 | Suelzle |
| 5,710,699 A | 1/1998 | King et al. |
| 5,745,356 A | 4/1998 | Tassitino et al. |
| 5,811,960 A | 9/1998 | Van Sickle et al. |
| 6,014,015 A | 1/2000 | Thorne et al. |
| 6,111,764 A | 8/2000 | Atou et al. |

(Continued)

FOREIGN PATENT DOCUMENTS

EP    1286444    2/2003

(Continued)

OTHER PUBLICATIONS

Son, Kwang, et al., "A Newton-Type Current Injection Model of UPFC for Studying Low-Frequency Oscillations," Power Engineering Society General Meeting, IEEE vol. 4, Jul. 13-17, 2003. (Abstract).

(Continued)

*Primary Examiner* — Paul L Rodriguez
*Assistant Examiner* — Sheela Rao
(74) *Attorney, Agent, or Firm* — Bell & Manning, LLC

(57) ABSTRACT

A microsource is provided, which includes an energy storage device, a power generation device, and a controller. The energy storage device is operably coupled for power transfer to a load through a first power bus. The power generation device is operably coupled for power transfer to the load through a second power bus. The controller determines a mode of operation for the energy storage device and the power generation device based on an energy level of the energy storage device and on the load; determines minimum power set points and maximum power set points for the energy storage device and the power generation device based on the determined mode of operation, on a storage output power measured at the first power bus, and on a generation output power measured at the second power bus; and controls an output power of the energy storage device and an output power of the power generation device based on the determined minimum and maximum power set points.

19 Claims, 19 Drawing Sheets

U.S. PATENT DOCUMENTS

| | | | |
|---|---|---|---|
| 6,134,124 | A | 10/2000 | Jungreis et al. |
| 6,172,432 | B1 | 1/2001 | Schnackenberg et al. |
| 6,188,205 | B1 | 2/2001 | Tanimoto et al. |
| 6,219,591 | B1 | 4/2001 | Vu et al. |
| 6,219,623 | B1 | 4/2001 | Wills |
| 6,249,411 | B1 | 6/2001 | Hemena et al. |
| 6,252,310 | B1 | 6/2001 | Wilhelm |
| 6,285,917 | B1 | 9/2001 | Sekiguchi et al. |
| 6,288,456 | B1 | 9/2001 | Cratty |
| 6,347,027 | B1 | 2/2002 | Nelson et al. |
| 6,356,471 | B1 | 3/2002 | Fang |
| 6,359,423 | B1 | 3/2002 | Noro |
| 6,452,289 | B1* | 9/2002 | Lansberry et al. ............... 307/25 |
| 6,465,910 | B2 | 10/2002 | Young et al. |
| 6,693,809 | B2 | 2/2004 | Engler |
| 6,703,719 | B1* | 3/2004 | McConnell ................ 290/52 |
| 6,787,933 | B2 | 9/2004 | Claude et al. |
| 6,812,586 | B2 | 11/2004 | Wacknow et al. |
| 6,870,279 | B2 | 3/2005 | Gilbreth et al. |
| 7,042,110 | B2 | 5/2006 | Mikhail et al. |
| 7,069,673 | B2 | 7/2006 | Kagoshima et al. |
| 7,116,010 | B2 | 10/2006 | Lasseter et al. |
| 7,346,462 | B2* | 3/2008 | Delmerico ................ 702/60 |
| 7,706,164 | B2* | 4/2010 | Nishi et al. ................ 363/146 |
| 2002/0169523 | A1* | 11/2002 | Ross et al. ................ 700/286 |
| 2003/0036806 | A1 | 2/2003 | Schienbein et al. |
| 2004/0051387 | A1 | 3/2004 | Lasseter et al. |
| 2004/0080165 | A1 | 4/2004 | Geis et al. |
| 2005/0165511 | A1* | 7/2005 | Fairlie ................ 700/286 |
| 2005/0234599 | A1* | 10/2005 | Kurokami et al. ........... 700/286 |
| 2006/0208574 | A1 | 9/2006 | Lasseter et al. |
| 2006/0276938 | A1* | 12/2006 | Miller ................ 700/295 |
| 2008/0114499 | A1* | 5/2008 | Hakim et al. ............. 700/291 |

FOREIGN PATENT DOCUMENTS

| | | |
|---|---|---|
| EP | 1383224 | 1/2004 |

OTHER PUBLICATIONS

Lasseter, Robert, Kevin Tomsovic, and Paolo Piagi. "Scenarios for Distributed Technology Applications with Steady State and Dynamic Models of Loads and Micro-Sources," Consortium for Electric Reliability Technology Solutions. Apr. 14, 2000.

DOE News, The DER Weekly, vol. 2, No. 10, pp. 1-4. Mar. 9, 2001.

Lasseter, Robert, et al. "White Paper on Integration of Distributed Energy Resources the CERTS MicroGrid Concept," Consortium for Electric Reliability Technology Solutions, pp. 1-27. Apr. 2002.

Lasseter, Robert, "MicroGrids," IEEE, No. 0-7803-7322-7, pp. 305-308. Jul. 2002.

USPTO, Notice of Allowance issued in U.S. Appl. No. 11/681,024 on Apr. 2, 2010, pp. 1-7.

An Office Action issued in U.S. Appl. No. 11/681,024 mailed on May 27, 2009.

PCT International Search Report for PCT/US2008/054566 dated Jul. 11, 2008.

PCT International Search Report for PCT/US2008/054572 dated Jul. 11, 2008.

PCT International Search Report for PCT/US2008/054577 dated Jul. 11, 2008.

Notice of Allowance issued in U.S. Appl. No. 11/681,014 mailed Jul. 30, 2009.

\* cited by examiner

CONTROL OF COMBINED STORAGE AND GENERATION IN DISTRIBUTED ENERGY RESOURCES

REFERENCE TO GOVERNMENT RIGHTS

This invention was made with United States government support awarded by the following agencies: National Science Foundation, Electrical & Communications System Div., Award No. 0078522. The United States government has certain rights in this invention.

FIELD

The field of the disclosure relates generally to power systems. More specifically, the disclosure relates to the control of storage and generation capabilities of a distributed energy resource included in a dynamic distribution system.

BACKGROUND

The demand for electrical power continues to grow worldwide. At the same time, aging transmission and distribution systems remain subject to occasional failures. Massive failures covering wide geographical areas and affecting millions of people have occurred, even in the United States, which has historically enjoyed a relatively reliable electrical power system. Problems with the capacity and reliability of the public power grid have driven the development of distributed energy resources (DER), small independent power generation systems which may be owned by, and located near, consumers of electrical power. DERs include a wide range of technologies, such as internal combustion engines, gas turbines, micro-turbines, photovoltaic cells, fuel cells, wind-power, storage systems, etc.

DERs can provide reliable power in critical applications as a backup to the primary electrical supply. For example, an interruption of power to a hospital can have life-threatening consequences. Similarly, when power to a factory is interrupted, productivity is lost, materials in process are wasted, and other costs are incurred in association with restarting the production line. Additionally, power from a DER can be provided to the main power grid to reduce energy price peaks by arbitraging energy price differentials. Geographically distributed sources of power, such as wind, solar, or hydroelectric power, may be too limited or intermittent to be used as the basis for a centralized power plant. However, these types of power sources can supplement or replace conventional power sources when the main power grid is available and can provide a backup when the main power grid is unavailable to increase energy efficiency and to reduce pollution and greenhouse gas emissions through the use of combined heat and power DER systems. DERs also can be used to meet load growth requirements and to enhance the robustness of the transmission system with a minimal addition of new lines.

Generally speaking, DERs can include two broad categories of electrical power sources: Direct current (DC) sources, such as fuel cells, solar cells, and batteries; and high-frequency analog current (AC) sources, such as micro-turbines and wind turbines. Both types of sources are typically used to provide an intermediate DC voltage, that may be produced directly by DC sources, and produced indirectly from AC sources, for example by rectification. In both types of sources, the intermediate DC voltage is subsequently converted to AC voltage or current at the required frequency, amplitude, and phase angle for use. In most cases, the conversion from the intermediate DC voltage to the usable AC voltage is performed by a voltage inverter that can rapidly control the magnitude and phase of its output voltage.

DERs may be designed to operate in one of two modes: (1) "isolation" or "island" mode, wherein the DER is isolated from the main grid, and (2) normal "grid" mode, wherein the DER is connected to the main grid to either import power from or export power to the main grid. Smooth and efficient transition between the two modes is a necessity to effectively integrate DERs into the distribution system without harming the integrity of the remaining system. A centralized electrical power utility is in a position to monitor and coordinate the production and distribution of power from multiple generators. In contrast, DERs may include independent producers of power who have limited awareness or communication with each other. Even if the independent producers of power are able to communicate with each other, there may not be an effective way to ensure that they cooperate. As a result, to realize the potential of integrating DERs into the distribution system, the integration should not depend on complex, centralized command and control systems. Thus, for effective integration of DERs into the distribution system, a method and a system capable of responding to events in a distribution system using only local information is needed.

Effective integration of DERs into the distribution system also benefits from fast acting energy sources, such as storage, which provide the energy required by the loads until slower sources ramp-up their energy output when a DER isolates from the distribution system. Storage sources also allow the exploitation of energy price differentials by charging of the DER when power costs are low (i.e. at night) and discharging of the DER when power costs are high (i.e. during peak loads). Additionally, storage within an intermittent renewable such as a wind and/or a solar system can discharge when the renewable energy is low (no wind or sun) and charge when there is excess renewable energy (high wind at 2 a.m.). Both storage and generation can be clustered with each other to take advantage of the beneficial characteristics of both storage and generation. For example, storage being inverter based can have a faster response to load demands than a generator. The storage can respond in a few electrical cycles while a traditional generator may take tens of cycles. On the other hand, generator cost generally is much less than energy storage based on a dollars/megawatt-hour comparison. Thus, what is further needed is a method and a system capable of effective utilization of power generation and storage resources within a DER system.

SUMMARY

A method and a system for effective utilization of power generation and storage resources within a DER system are provided in an exemplary embodiment. Each active component of the distribution system reacts to local information such as a voltage, a current, and a frequency to change its operating point. A coordination controller controls the operation of storage and generation through minimum and maximum power limits. The coordination controller controls the rate of charge and discharge and the charge level of the storage device and the mode of operation for the power generation device and the energy storage device. For example, the coordination controller determines which device tracks load and which may operate at a fixed output.

In an exemplary embodiment, a coordination controller for controlling an energy storage device and a power generation device used in a distributed energy resource is provided. The controller determines a mode of operation for the energy storage device and the power generation device based on an energy level of the energy storage device and on a load to which the energy storage device and the power generation device are operably coupled for power transfer. The controller determines a first minimum power set point and a first maximum power set point for the energy storage device based on the determined mode of operation and on a storage output power. The storage output power is measured at a first power bus operably coupled to the energy storage device. The controller determines a second minimum power set point and a second maximum power set point for the power generation device based on the determined mode of operation and on a generation output power. The generation output power is measured at a second power bus operably coupled to the power generation device. The controller controls a first output power of the energy storage device based on the determined first minimum power set point and the determined first maximum power set point. The controller also controls a second output power of the power generation device based on the determined second minimum power set point and the determined second maximum power set point.

In an exemplary embodiment, a microsource is provided. The microsource includes an energy storage device, a power generation device, and a controller. The energy storage device is operably coupled for power transfer to a load through a first power bus. The power generation device is operably coupled for power transfer to the load through a second power bus. The controller determines a mode of operation for the energy storage device and the power generation device based on an energy level of the energy storage device and on the load. The controller further determines minimum power set points and maximum power set points for the energy storage device and the power generation device based on the determined mode of operation, on a storage output power measured at the first power bus, and on a generation output power measured at the second power bus. The controller controls an output power of the energy storage device and an output power of the power generation device based on the determined minimum and maximum power set points.

In another exemplary embodiment, a method of controlling an energy storage device and a power generation device used in a distributed energy resource is provided. A mode of operation for the energy storage device and the power generation device is determined based on an energy level of the energy storage device and on a load to which the energy storage device and the power generation device are operably coupled for power transfer. A first minimum power set point and a first maximum power set point for the energy storage device are determined based on the determined mode of operation and on a storage output power. The storage output power is measured at a first power bus operably coupled to the energy storage device. A second minimum power set point and a second maximum power set point for the power generation device are determined based on the determined mode of operation and on a generation output power. The generation output power is measured at a second power bus operably coupled to the power generation device. A first output power of the energy storage device is controlled based on the determined first minimum power set point and the determined first maximum power set point. A second output power of the power generation device is controlled based on the determined second minimum power set point and the determined second maximum power set point.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
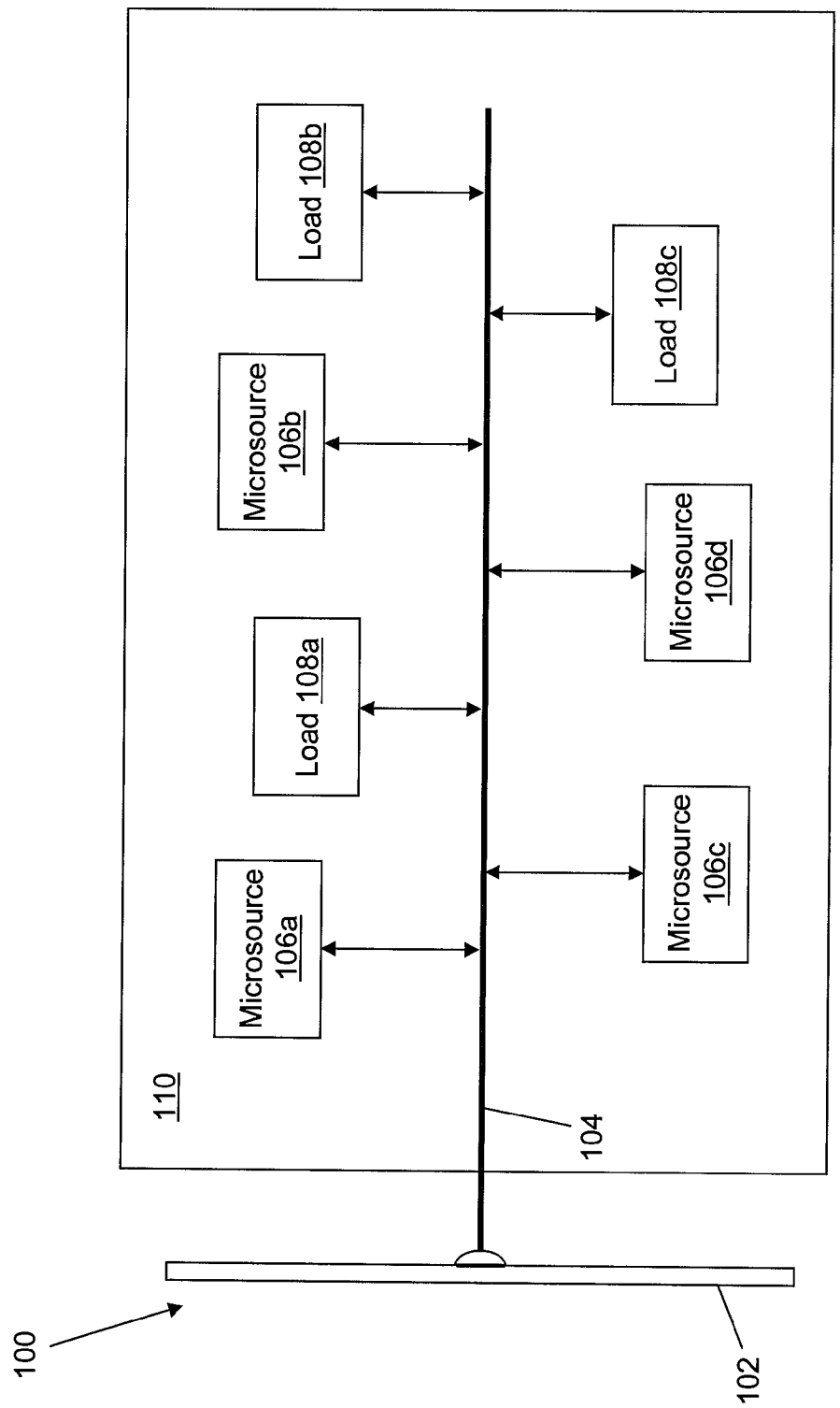
FIG. 1 depicts a block diagram of a distributed energy resource (DER) system in accordance with an exemplary embodiment.

With reference to FIG. 1, a distributed energy resource (DER) system 100 is shown in accordance with an exemplary embodiment. Such an exemplary system is described, for example, in U.S. Pat. No. 7,116,010 and/or in U.S. Patent Publication No. 2006/000208574, the contents of which are incorporated by reference. Where the disclosure of the present application is limited by or in conflict with the disclosures of U.S. Pat. No. 7,116,010 and U.S. Patent Publication No. 2006/000208574, the disclosure of the present application controls. DER system 100 may include a utility supply 102 connected to a feeder line 104 that interconnects one or more microsource systems 106a, 106b, 106c, and 106d and one or more loads 108a, 108b, and 108c. DER system 100 may include a plurality of feeder lines. Feeder line 104, the one or more microsource systems 106a, 106b, 106c, and 106d, and the one or more loads 108a, 108b, and 108c can form a microgrid 110. Utility supply 102 can connect microgrid 110 to other similar microgrids distributed throughout DER system 100. A microsource system can include exemplary microsource power sources, power storage, and power controllers. The power source can be, for example, a fuel cell, hydroelectric generator, photovoltaic array, windmill, microturbine, etc. The power storage, if present, can be, for example, a battery or flywheel.

Feeder line 104 may include one or more interface switches. An exemplary interface switch is described, for example, in U.S. patent application Ser. No. 11/266,976, filed Nov. 4, 2005 and entitled INTERFACE SWITCH FOR DISTRIBUTED ENERGY RESOURCES, the contents of which are incorporated by reference. Where the disclosure of the present application is limited by or in conflict with the disclosure of U.S. patent application Ser. No. 11/266,976, the disclosure of the present application controls. The interface switch, if used, can be positioned between feeder line 104 and utility supply 102 so that microgrid 110 can be isolated from utility supply 102. When microgrid 110 is isolated from utility supply 102, the microgrid 110 is said to be operating in "island mode". When microgrid 110 is connected to the utility supply 110, the microgrid 110 is said to be operating in "grid mode". When DER system 100 is connected to the grid, the one or more loads 108a, 108b, and 108c may receive power from both the grid and local sources, depending on the current situational demands.

When a microsource or microgrid operates in island mode, load tracking problems can arise because typical power sources used in microsources, such as microturbines or fuel cells, tend to respond slowly, with time constants ranging from 10 to 200 seconds. Additionally, these types of power sources may be inertialess. Conventional utility power systems store energy in the inertia of the spinning mass of a generator. When a new load comes online, the initial energy balance can be met by the system's inertia, which results in a slight reduction in system frequency. Because power sources in microsources may be inertialess, a microsource may include power storage to ensure initial energy balance when loads are added during island mode.

Each microsource system 106a, 106b, 106c, and 106d preferably includes a microsource controller. The microsource controller responds to events using local information to respond to voltage drops, faults, blackouts, etc. and to switch to island operation mode as needed. The microsource controller controls the change in the output power of the system components as they change from a dispatched power mode to one in which frequency is controlled and load following is provided. Control schemes for a power controller in DER system 100 can be classified into one of three broad classes: unit power control, zone power control, and a mixed system using both unit power control and zone power control. Using a unit power controller, load changes are matched by a corresponding power injection from the utility because a microsource holds its injection to a set point $P_0$. During island mode, the microsource matches the power demand as loads change. Each microsource system 106a, 106b, 106c, and 106d regulates the voltage magnitude at its connection point and the injected power using either a variable slope method or a fixed slope method.

Using a zone power controller, power flow in zones is controlled instead of controlling the power flow from each microsource. Each microsource system 106a, 106b, 106c, and 106d regulates the voltage magnitude at its connection point and the power that is flowing in the feeder. Using a zone power controller, the microsource systems 106a, 106b, 106c, and 106d pick-up extra load demands, and as a result, show a constant load to the utility grid. In this case, DER system 100 becomes a true dispatchable load as seen from the utility side supporting demand-side management arrangements. To reduce confusion, the symbol, F, is used for power flow in a zone and the symbol, P, is used for the power output from a microsource. When connected to the grid, load changes are matched by a different power injection from the microsource because the controller holds the flow of power coming from the grid, $F_{line}$, to a constant value. During island mode, all of the microsources participate in matching the power demand as loads change.

Figure 2:
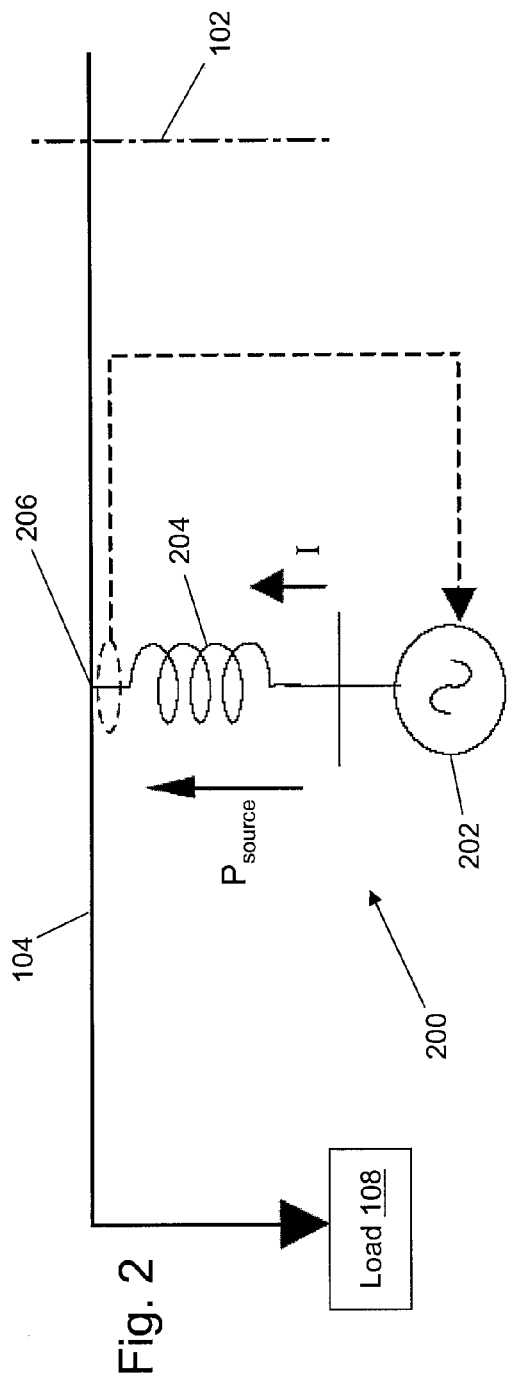
FIG. 2 is a diagram of a microgrid that includes a microsource implementing a unit power control scheme in accordance with an exemplary embodiment.

With reference to FIG. 2, a diagram of a microgrid 200 is shown in accordance with an exemplary embodiment using a unit power controller. Microgrid 200 may include a microsource 202 and a load 108. Microsource 202 may be connected to feeder line 104 by an inductor 204. An interface switch may be provided, for example, in feeder line 104. The interface switch can be opened to isolate microgrid 200 from the rest of DER system 100 and can be closed to connect microgrid 200 to the rest of DER system 100. Microsource 202 may include a controller capable of measuring a current through inductor 204 and of measuring a system voltage at a point 206 in feeder line 104 where inductor 204 joins feeder line 104.

Figure 3:
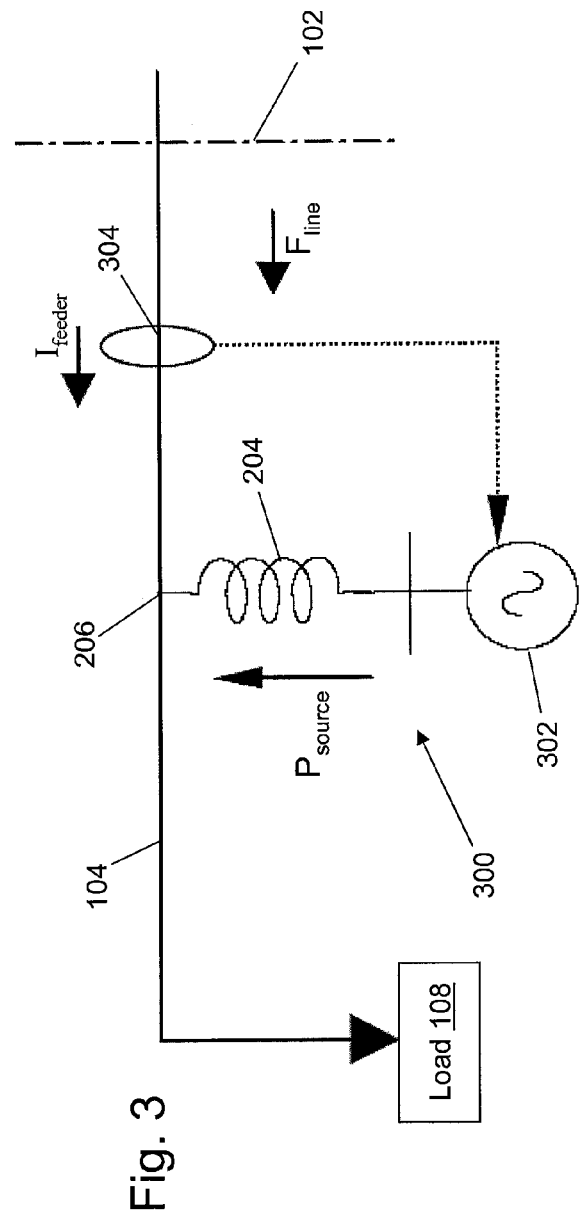
FIG. 3 is a diagram of a microgrid that includes a microsource implementing a zone power control scheme in accordance with an exemplary embodiment.

With reference to FIG. 3, a diagram of a microgrid 300 is shown in accordance with an exemplary embodiment using a zone power controller. Microgrid 300 may include a microsource 302 and load 108. Microsource 302 may be connected to feeder line 104 by inductor 204. An interface switch may be provided, for example, in feeder line 104. The interface switch can be opened to isolate microgrid 300 from the rest of DER system 100 and can be closed to connect microgrid 300 to the rest of DER system 100. Microsource 302 may include a controller capable of measuring a current at a point 304 in feeder line 104 between utility supply 102 and inductor 204 and of measuring a system voltage at a point 206 in feeder line 104 where inductor 204 joins feeder line 104.

Figure 4:
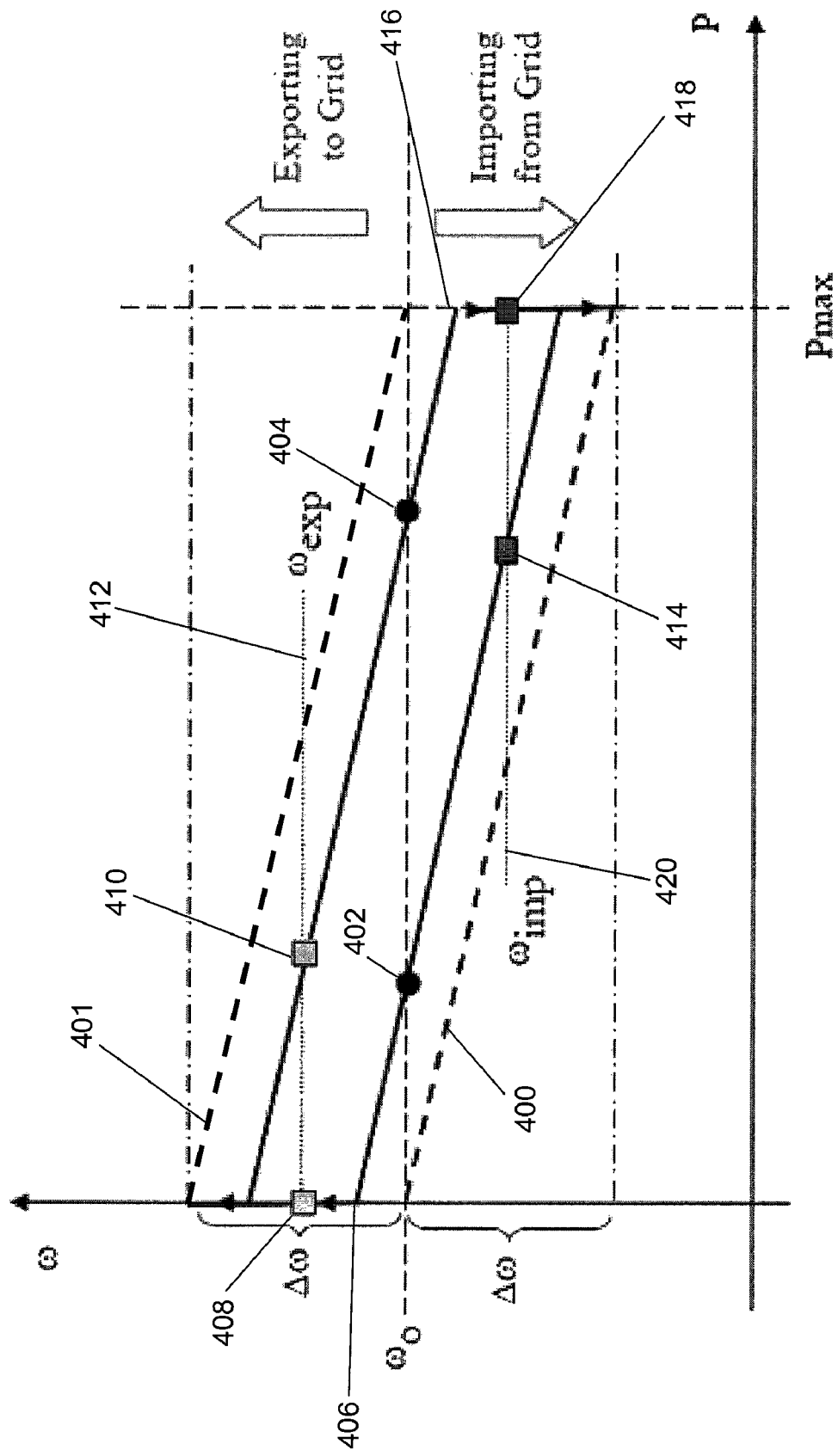
FIG. 4 is a graph depicting the relationship between steady state unit power vs. frequency (P-ω) for two exemplary microsources having different loads for use in a unit power control scheme in accordance with an exemplary embodiment.

With reference to FIG. 4, a graph depicting the relationship between steady state unit power and frequency (P-ω) using a fixed minimum slope method and unit power control is shown in accordance with an exemplary embodiment. FIG. 4 shows steady state characteristics. The response may deviate from the characteristic during a transition period. Two exemplary microsources included in the microgrid are shown. The microsources have different power set points though this is not required. A first microsource has a first power set point 402. A second microsource has a second power set point 404. First power set point 402 and second power set point 404 are the amount of power injected by each source when connected to the grid at a system frequency $\omega_o$. A constant slope $$m = -\frac{\Delta\omega}{P_{max}}$$

allows power to change between P=0 and P=$P_{max}$ as frequency changes over $\Delta\omega$. A lower bounding line 400 extends from P=0 to P=$P_{max}$ with a starting frequency of $\omega_o$. An upper bounding line 401 extends from P=0 to P=$P_{max}$ with a starting frequency of $\omega_o+\Delta\omega$. Because a constant slope is used by the controller, the response lines are all parallel to and extend between lower bounding line 400 and upper bounding line 401.

Movement along the lines of constant slope m in response to a transition to island mode depends on whether or not the microgrid is importing power from or exporting power to the grid. If the system was exporting to the grid before islanding, the resulting frequency of $\omega_{exp}$ 412 is greater than the system frequency $\omega_o$. For example, if the system was exporting to the grid before islanding, the second microsource may move from the system frequency $\omega_o$ at second power set point 404 to a third power set point 410 operating at $\omega_{exp}$ 412. The first microsource may shift from the system frequency $\omega_o$ at first power set point 402 to a fourth power set point 406 at P=0. When the P=0 limit is reached, the slope of the characteristic is switched to vertical, as shown by the arrows, to move the first microsource frequency upwards to a fifth power set point 408 operating at $\omega_{exp}$ 412. The specific set points, of course, depend on the local demands and operating points of the microsources. A P=0 limit may not be reached by either microsource.

If the system was importing from the grid before islanding, the resulting frequency of $\omega_{imp}$ 420 will be smaller than the system frequency $\omega_o$. For example, if the system was importing to the grid before islanding, the first microsource may move from the system frequency $\omega_o$ at first power set point 402 to a sixth power set point 414 operating at $\omega_{imp}$ 420. The second microsource may move from the system frequency $\omega_o$ at second power set point 404 to a seventh power set point 416 at P=$P_{max}$. When the P=$P_{max}$ limit is reached, the slope of the characteristic is switched to vertical, as shown by the arrows, to move the second microsource frequency downwards to an eighth power set point 418 operating at $\omega_{imp}$ 420. The minimum and maximum power limits are enforced by switching the characteristic with constant slope to a vertical steady state characteristic when the minimum or maximum power limit is reached. The specific set points, of course, depend on the local demands and operating points of the microsources. A P=$P_{max}$ limit may not be reached by either microsource.

Figure 5:
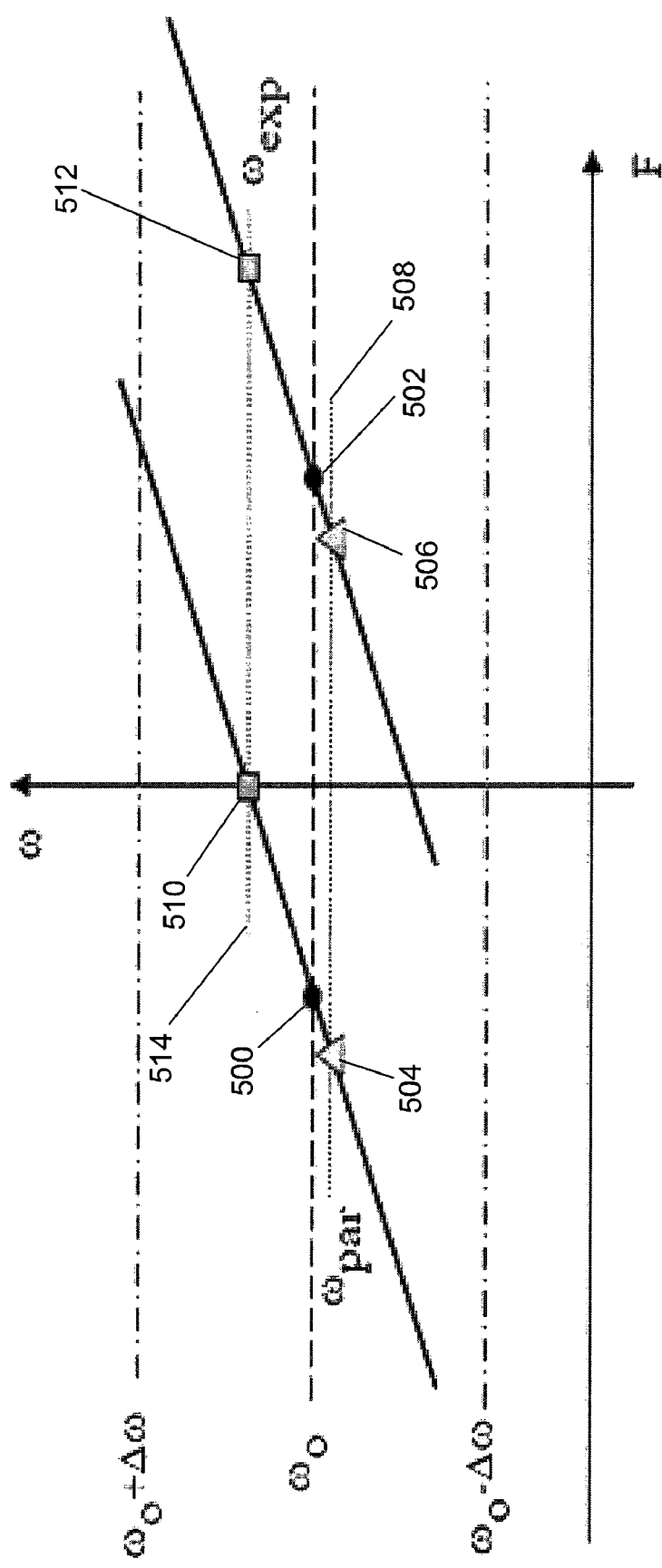
FIG. 5 is a graph depicting the relationship between steady state zone power vs. frequency (F-ω) for two exemplary microsources having different loads for use in a zone power control scheme in accordance with an exemplary embodiment.

With reference to FIG. 5, a graph depicting the relationship between steady state zone power and frequency (F-$\omega$) using a fixed minimum slope method and zone power control is shown in accordance with an exemplary embodiment. Two exemplary microsources are included in the microgrid. The microsources have different power set points. A first microsource has a first flow set point 500. A second microsource has a second flow set point 502. The slope is fixed at the minimum slope m, but has a reversed sign because of the relation between the microsource output power, P, and the zone power flow, F, which can be derived by inspection of FIG. 3 as $F_{line}+P_{source}$=Load. $F_{line}$ is the power (imported means positive) from the rest of DER system 100, and $P_{source}$ is the power injected or absorbed by microsource 302. The power injected or absorbed by microsource 302 is assumed to be greater than the minimum power output, $P_{min}$, of microsource 302 and less than the maximum power output, $P_{max}$, of microsource 302. For a microsource capable of power injection only, $P_{min}$ is positive or zero, while a bidirectional device capable of both power injection or power storage may have $P_{min}$<0. Load is the overall loading level seen by microsource 302.

Figure 6:
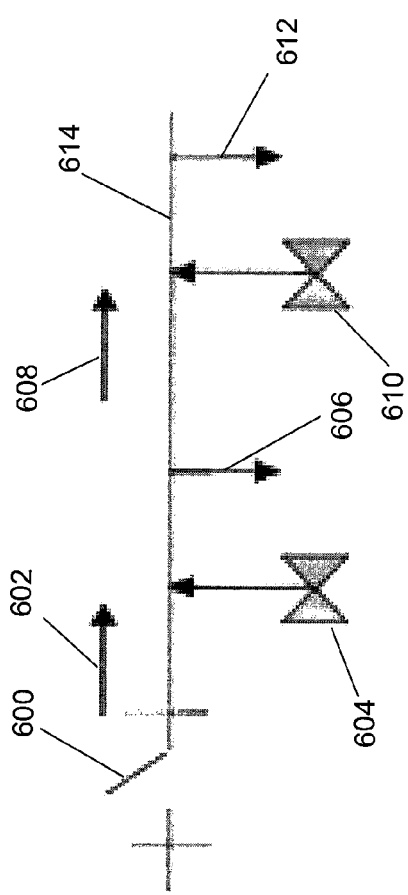
FIG. 6 is a diagram of two microsources used in a single zone in accordance with an exemplary embodiment.

During connection with the grid, the flow in the zones tracks the requested values at the system frequency $\omega_o$. When the microgrid transfers to island mode, the two microsources readjust the flow depending on the arrangement of the microsources with respect to each other and utility supply 102. When regulating unit power, the relative location of loads and microsources is irrelevant, but when regulating zone power flow, the relative location of loads and microsources is important. For example, with reference to FIG. 6, a first microsource 604 and a second microsource 610 are arranged in series in a single zone. The use of a single zone is for illustrative purposes only. There can be a greater or a lesser number of microsources in a single zone.

The zone includes a first load 606 and a second load 612 on a local power bus 614 connected by an interface switch 600 to utility supply 102. During a transition to island mode, interface switch 600 opens. As a result, in a zone power control method for the circuit of FIG. 6, a first flow 602 nearest to the utility system is zero in island mode. A second flow 608 may increase to compensate for the first flow 602 transition to zero. Thus, with reference to FIG. 5, first flow 602 moves from the system frequency $\omega_o$ at first flow set point 500 to a third flow set point 510 operating at the frequency $\omega_{exp}$ 514. Second flow 608 moves from the system frequency $\omega_o$ at second flow set point 502 to a fourth power set point 512. As a result, in island mode, the system operates at frequency $\omega_{exp}$ 514 where first flow 602 is zero. Frequency $\omega_{exp}$ 514 is larger than the nominal system frequency $\omega_o$ because the system was exporting to the grid (|first flow 602|<|second flow 608|), which is the same behavior seen using unit power control.

Figure 7:
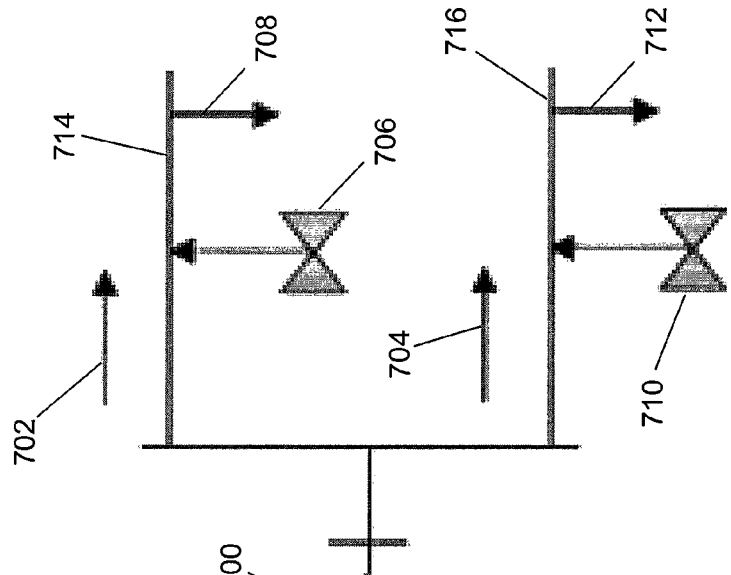
FIG. 7 is a diagram of two microsources used in multiple zones in accordance with an exemplary embodiment.

With reference to FIG. 7, a first microsource 706 and a second microsource 710 are arranged in parallel in two zones. The use of two zones each with a single microsource is for illustrative purposes only. There can be a greater or a lesser number of microsources in a greater or a lesser number of zones. A first load 708 is located on a first local power bus 714 connected by an interface switch 700 to utility supply 102. A second load 712 is located on a second local power bus 716 connected by interface switch 700 to utility supply 102. A first flow 702 flows through first local power bus 714, and a second flow 704 flows through second local power bus 716. The grid flow is the algebraic sum of first flow 702 and second flow 704. During a transition to island mode, interface switch 700 opens.

In a zone power control method for the arrangement of FIG. 7, during island mode, the frequency takes the value where the sum of the flows is zero. As a result, as shown on FIG. 5, the frequency in island mode is frequency $\omega_{par}$ 508 where F1=−F2. With reference to FIG. 5, first flow 702 moves from the system frequency $\omega_o$ at first flow set point 500 to a fifth flow set point 504 operating at the frequency $\omega_{par}$ 508. Second flow 704 moves from the system frequency $\omega_o$ at second flow set point 502 to a sixth power set point 506 at the frequency $\omega_{par}$ 508.

Figure 8A:
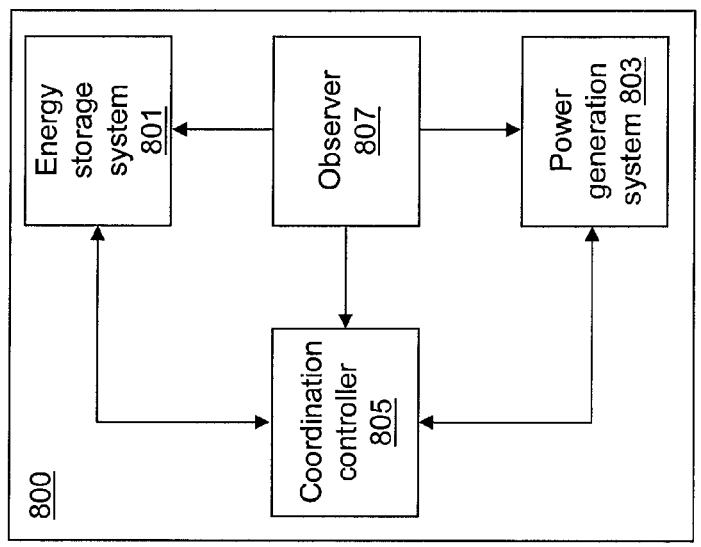
FIG. 8a is a block diagram of a controller of a microsource used in a distributed energy resource that includes both a power generation system and an energy storage system in accordance with an exemplary embodiment.

With reference to FIG. 8a, a microsource 800 is shown in accordance with an exemplary embodiment. Microsource 800 may include an energy storage system 801, a power generation system 803, a coordination controller 805, and an observer 807. Coordination controller 805 controls the operation of energy storage system 801 and power generation system 803 and the mode of operation of each device. Observer 807 provides characteristic parameters of microsource 800 and of a DER system to which microsource 800 is connected for use by energy storage system 801, power generation system 803, and coordination controller 805. Microsource 800 and its various components may be implemented in or include hardware, firmware, software, and/or any combination of these methods. Thus, microsource 800 may include circuitry that can implement the processes indicated in the form of hardware, firmware, and/or a processor executing instructions embodied in software.

Figure 8B:
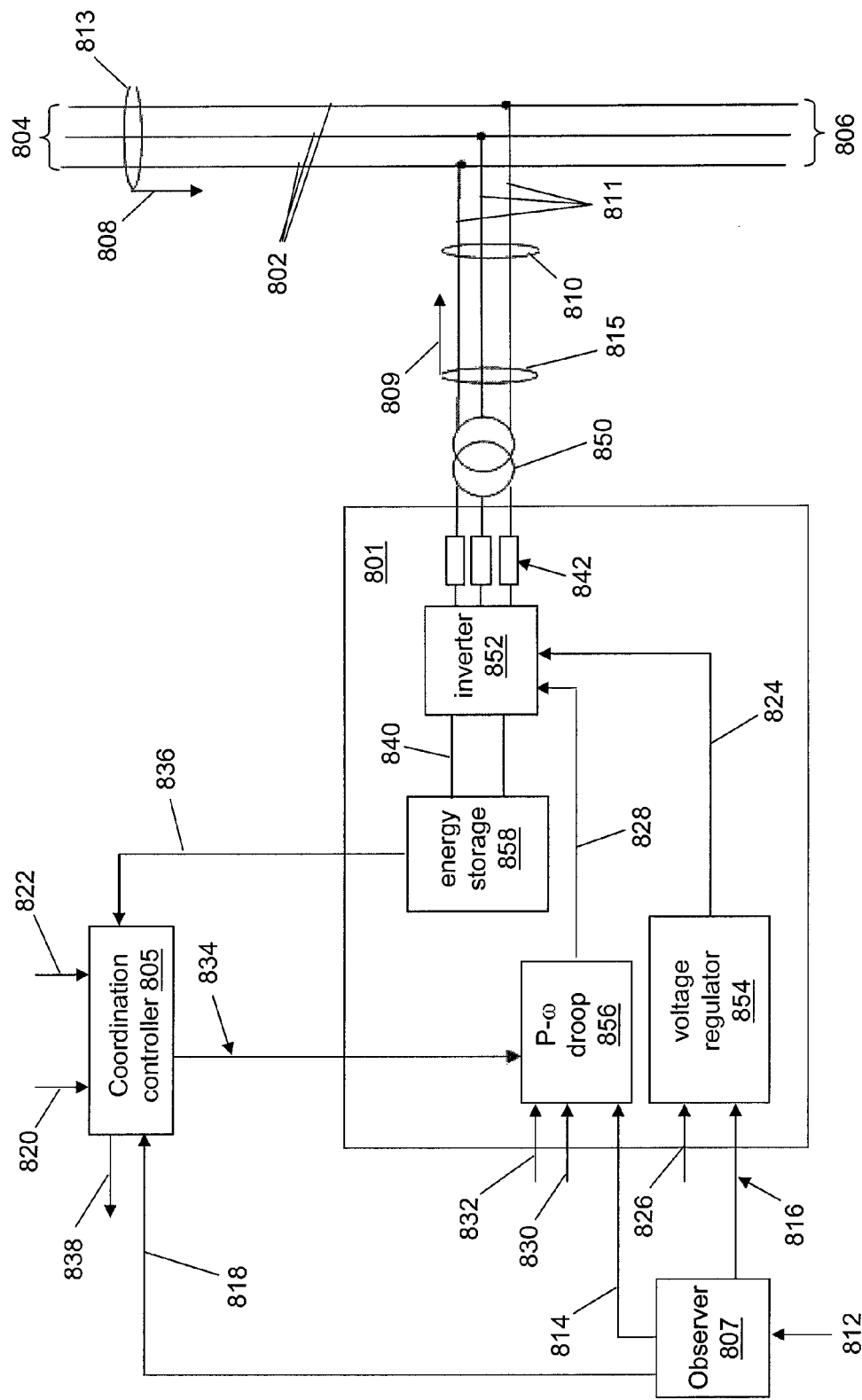
FIG. 8b is a block diagram of an energy storage system of FIG. 8a in accordance with an exemplary embodiment.

With reference to FIG. 8*b*, microsource 800 connects to a grid through feeder lines 802. Feeder lines 802 extend toward utility supply 102 in a first direction 804 and away from utility supply 102 in a second direction 806. Microsource 800 connects to feeder lines 802 through bus lines 811 which connect with a first transformer 850. A first sensor 813 measures a feeder current 808 through feeder lines 802 and sends the measured feeder current to observer 807. A second sensor 810 measures a feeder bus voltage at the connection point of bus lines 811 with feeder lines 802 and sends the measured feeder bus voltage to observer 807. A third sensor 815 measures an inverter current 809 through bus lines 811 between first transformer 850 and feeder lines 802 and sends the measured inverter current to observer 807. Observer 807 captures local measurements 812 for input to energy storage system 801, power generation system 803, and coordination controller 805.

With continuing reference to FIG. 8*b*, energy storage system 801 is shown in accordance with an exemplary embodiment. Energy storage system 801 may include an inductor 842, an inverter 852, a first voltage regulator 854, a P-ω droop controller 856, and an energy storage device 858. Observer 807 sends droop controller inputs 814 to P-ω droop controller 856. Observer 807 sends first voltage regulator inputs 816 to first voltage regulator 854. Observer 807 sends coordination controller inputs 818 to coordination controller 805. Inverter 852 connects to feeder lines 802 through inductor 842 and first transformer 850. Inverter 852 generates an output voltage at a phase angle of δ. In general, the magnitude of δ is small enough to satisfy the approximation sin(δ)~δ. This implies that power is linear relative to δ. Inverter 852 generates an output voltage at a phase angle of δ. Energy storage device 858 connects with inverter 852 through a DC bus 840.

First voltage regulator 854 assists in decoupling interactions between DER microsources and includes a voltage vs. reactive power droop controller so that, as the reactive power Q generated by inverter 852 becomes more capacitive, a local voltage set point 826 is reduced. Conversely, as Q becomes more inductive, local voltage set point 826 is increased.

Coordination controller 805 controls the rate of charge and discharge and the charge levels of energy storage device 858 by setting storage power output limits 834 input to P-ω droop controller 856 based on an energy level 836 received from energy storage device 858. P-ω droop controller 856 provides the P-ω and/or F-ω functions described with reference to FIGS. 4 and 5. Coordination controller 805 further receives storage set points 820 and an operational mode 822 as inputs to control the operation of energy storage system 801 and power generation system 803.

Figure 8C:
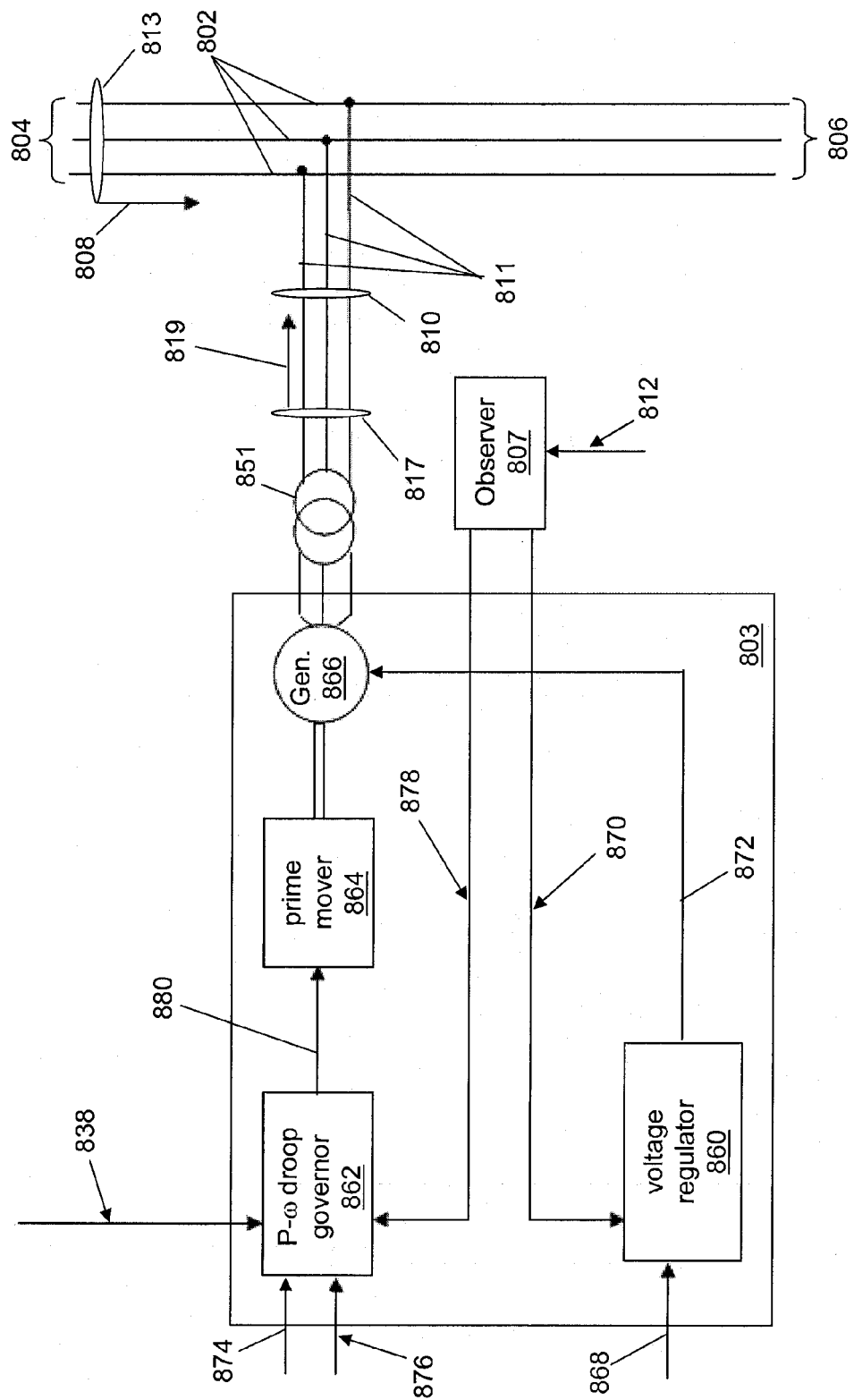
FIG. 8c is a block diagram of an power generation system of FIG. 8a in accordance with an exemplary embodiment.

With reference to FIG. 8*c*, power generation system 803 is shown in accordance with an exemplary embodiment. Power generation system 803 may include a second voltage regulator 860, a P-ω droop governor 862, a prime mover 864, and a generator 866. Generator 866 connects to feeder lines 802 through a second transformer 851. A fourth sensor 817 measures a generator current 819 through bus lines 811 between second transformer 851 and feeder lines 802 and sends the measured generator current to observer 807. Generator 866 may be directly connected to the grid. As a result, second transformer 851 need not be included in microsource 800. For example, if the internal reactance is large enough to achieve the necessary isolation, second transformer 851 is not needed. Prime mover 864 attaches to a rotor shaft of generator 866 to drive generator 866. Typically, the electrical output provided by generator 866 is responsive to the excitation of a field coil in generator 866. Fuel is combusted in prime mover 864 to cause an output shaft to turn at a rotational speed or frequency $\omega_{shaft}$, which in turn drives the frequency of the output of generator 866.

Second voltage regulator 860 assists in decoupling interactions between DER microsources and includes a voltage vs. reactive power droop controller so that, as the reactive power Q generated by generator 866 becomes more capacitive, a local voltage set point 868 is reduced. Conversely, as Q becomes more inductive, local voltage set point 868 is increased. P-ω droop governor 862 provides the P-ω and/or F-ω functions described with reference to FIGS. 4 and 5. P-ω droop governor 862 additionally provides control over prime mover 864. Prime mover 864 can be, for example, an engine, micro turbine, wind turbine, mechanical storage, etc.

Local measurements 812 to observer 807 may include feeder current 808, the feeder bus voltage, inverter bus current 809, generator bus current 819, three phase reactive power Q injected onto utility supply 102 by generator 866 and energy storage device 858, the injected three phase power P injected onto utility supply 102 by generator 866 and energy storage device 858, the three phase grid power flow F, the angular velocity or frequency of the shaft $\omega_{shaft}$ of generator 866, etc. Observer 807 uses electrical measurements of current, voltage, power, energy storage levels, and generator state to calculate data needed by energy storage system 801, power generation system 803, and coordination controller 805. Observer 807 sends droop governor inputs 878 to P-ω droop governor 862. Observer 807 sends second voltage regulator inputs 870 to second voltage regulator 860. Coordination controller 805 controls the operation of power generation system 803 by setting generator power output limits 838 input to P-ω droop governor 862 based on a generator power received from observer 807.

Figure 9A:
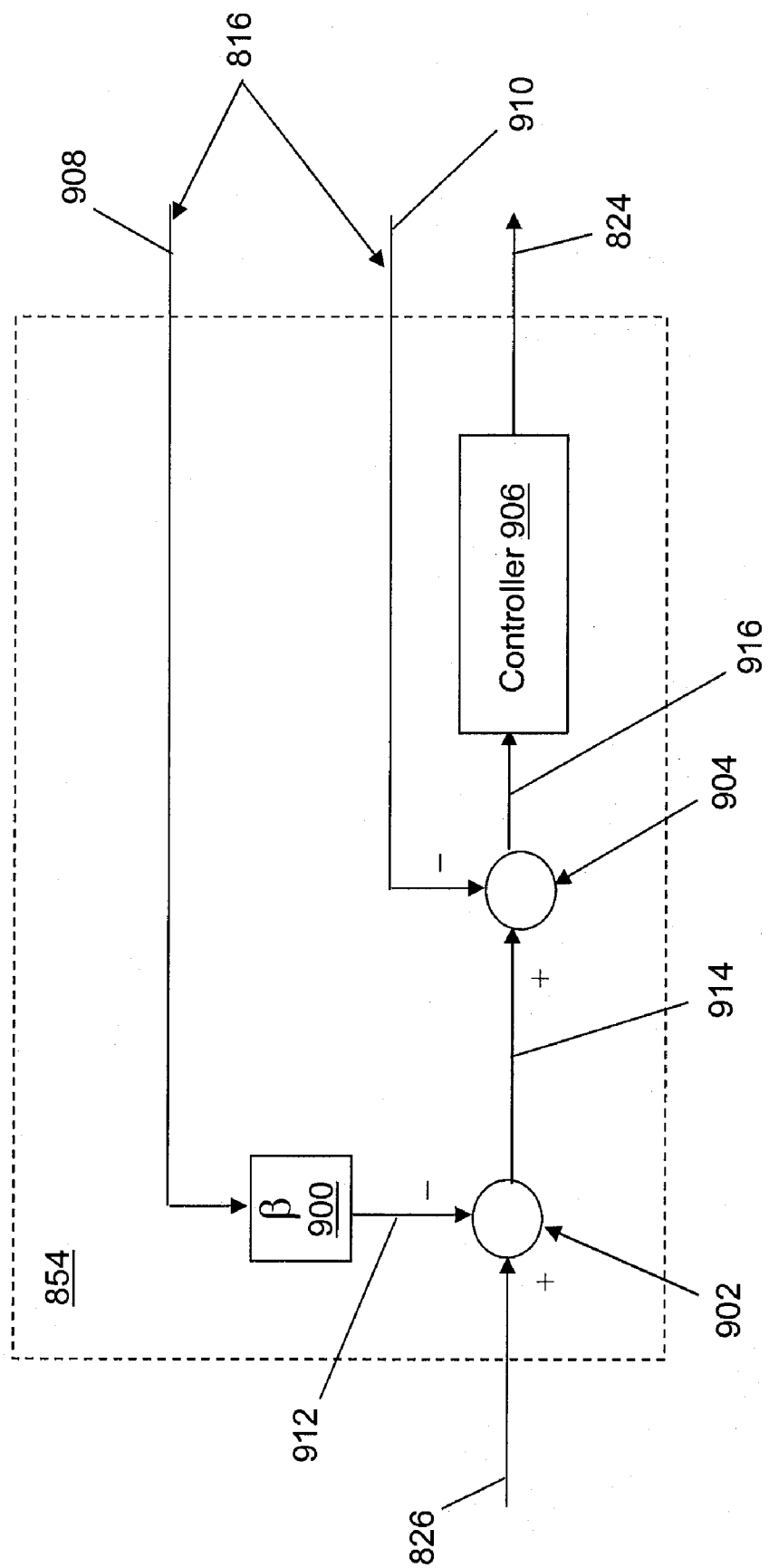
FIG. 9a is a block diagram of a voltage regulator of the energy storage system of FIG. 8b in accordance with an exemplary embodiment.

With reference to FIG. 9*a*, a block diagram of first voltage regulator 854 is shown in accordance with an exemplary embodiment. First voltage regulator 854 may include a β block 900, a first summer 902, a second summer 904, and a controller 906. The local voltage set point 826 is input to first voltage regulator 854. A regulated output voltage 824 is output from first voltage regulator 854 and input to inverter 852. Creating an appropriate regulated output voltage at the terminals of inverter 852 regulates the feeder bus voltage. A plurality of inputs 816 from observer 807 include a storage reactive power Q 908 and feeder bus voltage 910. Storage reactive power Q 908 is input to β block 900, which calculates a modified reactive power 912.

Figure 12:
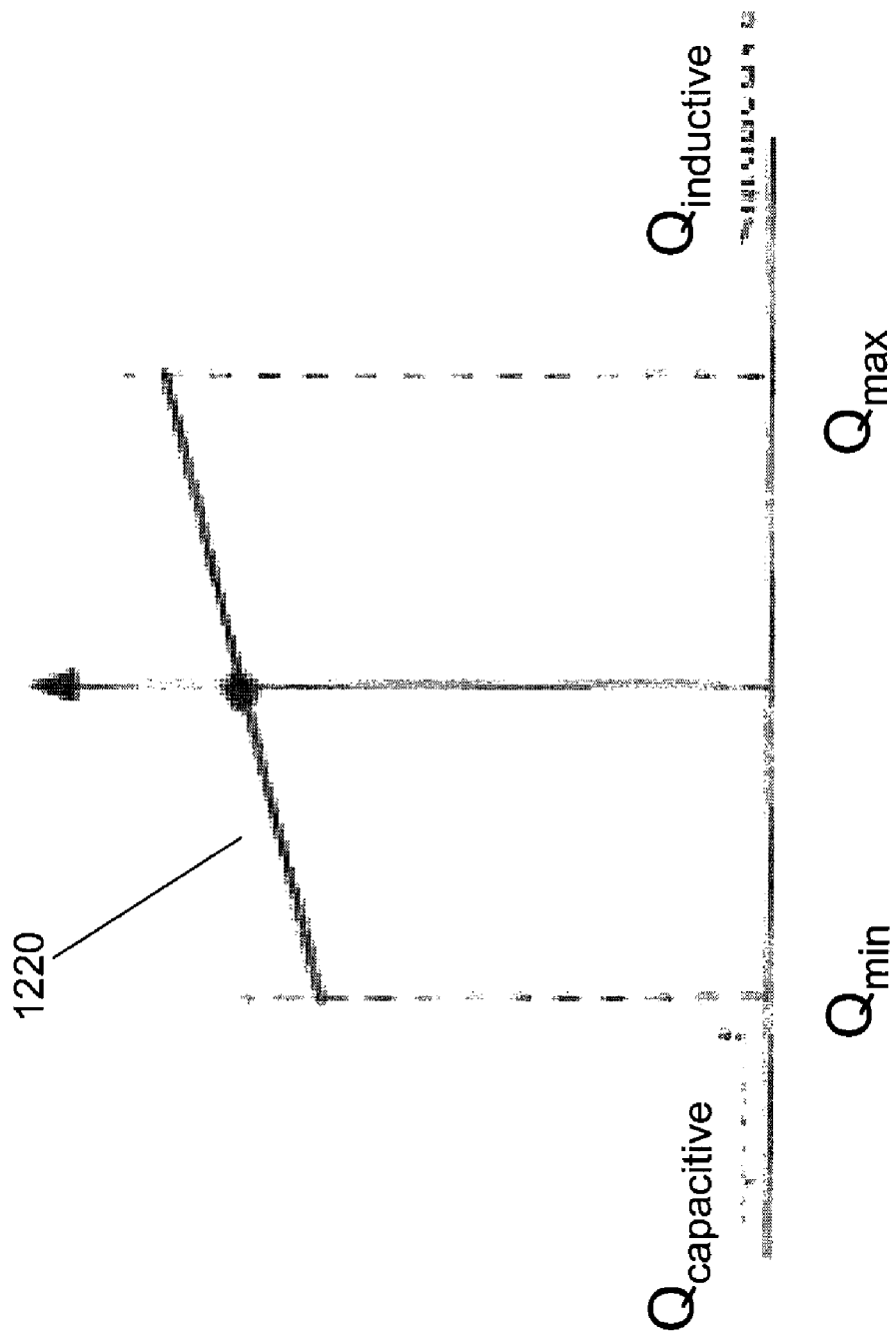
FIG. 12 is a graph of an exemplary voltage droop regulation characteristic for a voltage regulator in accordance with an exemplary embodiment.

The modified reactive power 912 is subtracted from local voltage set point 826 in first summer 902 to define a desired local voltage set point 914 based on a droop constant β defined in β block 900. In an exemplary embodiment, β block 900 is implemented to exhibit a voltage vs. reactive current droop as shown with reference to FIG. 12. Droop constant β is the slope of the droop characteristic line 1220. As reactive power Q becomes more inductive, the desired local voltage set point 914 becomes larger than the local voltage set point 826. As reactive power Q becomes more capacitive, the desired local voltage set point 914 becomes smaller than the local voltage set point 826. A feeder bus voltage 910 is compared to the desired local voltage set point 914 in second summer 904. For example, feeder bus voltage 910 is subtracted from the desired local voltage set point 914. The resulting voltage error 916 is input to controller 906 to generate the regulated output voltage 824. In an exemplary embodiment, controller 906 is a proportional-integral (PI) controller.

Figure 9B:
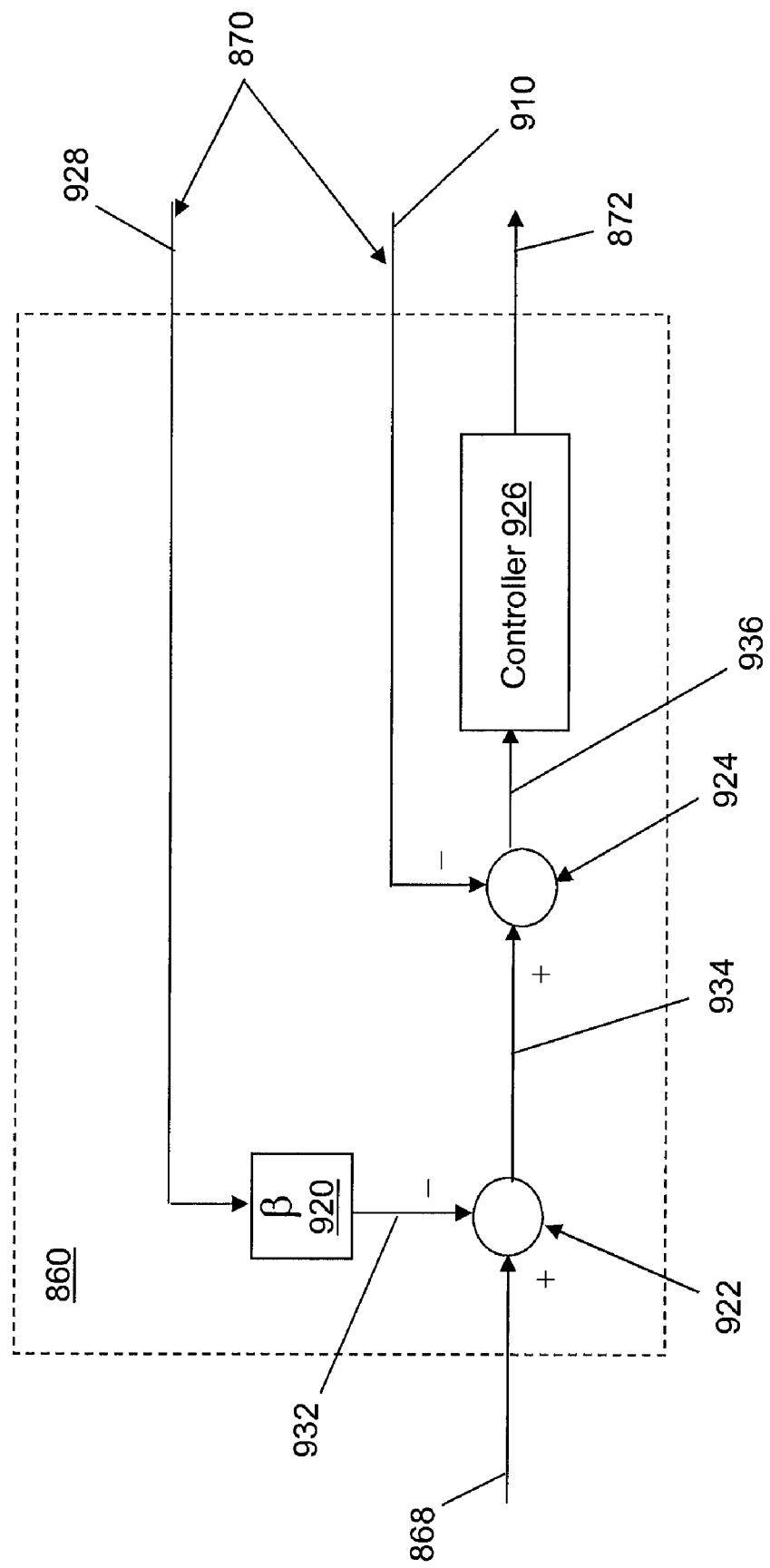
FIG. 9b is a block diagram of a voltage regulator of the power generation system of FIG. 8c in accordance with an exemplary embodiment.

With reference to FIG. 9b, a block diagram of second voltage regulator 860 is shown in accordance with an exemplary embodiment. Second voltage regulator 860 may include a second β block 920, a third summer 922, a fourth summer 924, and a second controller 926. The local voltage set point 868 is input to second voltage regulator 860. Local voltage set point 868 of second voltage regulator 860 may or may not be the same as local voltage set point 826 of first voltage regulator 854. A regulated output voltage 872 is output from second voltage regulator 860 and input to generator 866. Creating an appropriate regulated output voltage at the terminals of generator 866 regulates the feeder bus voltage. A plurality of inputs 870 from observer 807 include a generator reactive power Q 928 and feeder bus voltage 910. Generator reactive power Q 928 is input to second β block 920, which calculates a modified reactive power 932.

The modified reactive power 932 is subtracted from local voltage set point 868 in third summer 922 to define a desired local voltage set point 934 based on a droop constant β defined in β block 920 as discussed previously with reference to β block 900 of first voltage regulator 854. Feeder bus voltage 910 is compared to the desired local voltage set point 934 in fourth summer 924. For example, feeder bus voltage 910 is subtracted from the desired local voltage set point 934. The resulting voltage error 936 is input to second controller 926 to generate the regulated output voltage 872. In an exemplary embodiment, second controller 926 is a PI controller.

Figure 10:
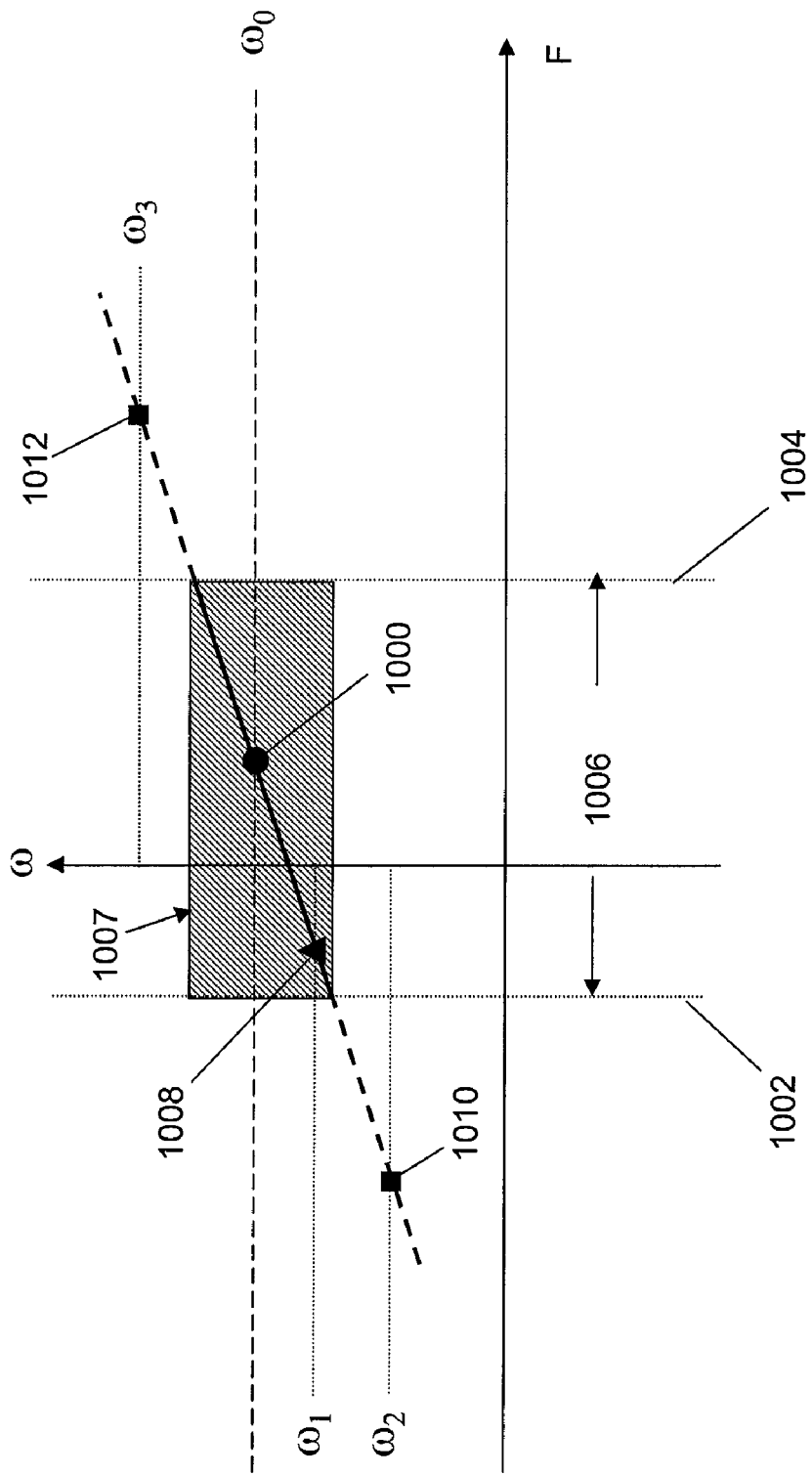
FIG. 10 is a graph depicting a sliding window for applying power limits in accordance with an exemplary embodiment.

Energy storage device 858 normally operates in flow control mode with a F-ω characteristic as shown in FIG. 5. In some situations, energy storage device 858 may operate in unit power control mode with a P-ω characteristic as shown in FIG. 4. In either case, the limits of power from energy storage device 858 are input from coordination controller 805 to P-ω droop controller 856. With reference to FIG. 10, the range of output power, P, available from energy storage device 858 imposes a window 1007 on feeder flow, F, such that $P_{load}-P_{max}<F<P_{load}-P_{min}$, where $P_{load}$ is the load on the system, and $P_{max}$ and $P_{min}$ are the limits on energy storage device 858. When charging, $P_{min}$ is negative. A system F-$ω_o$ operating point 1000 is defined for the system frequency $ω_o$. The limits for the feeder flow, F, can be visualized on the F-ω plane as a window whose width 1006 is the difference between $F_{min}$ 1002 and $F_{max}$ 1004 which equals the difference between $P_{max}$ and $P_{min}$. The location of the window on the F-axis depends on the value of $P_{load}$. As $P_{load}$ increases, window 1007 slides to the right on the F-ω plane. Conversely, if the load is reduced, window 1007 slides to the left on the F-ω plane.

An example flow set point 1008 falls within window 1007. Situations are possible that can result in the flow set point falling outside window 1007. For example, load levels while connected to the grid, an incorrect choice for the flow set point, a change in output power of other microsources, and a transfer to island mode all can cause the flow set point to fall outside window 1007. For example, a first flow set point 1010 falls to the left of window 1007. In this situation, $P_{max}$ is exceeded. As another example, a second flow set point 1012 falls to the right of window 1007. In this situation, $P_{min}$ is exceeded. To avoid a flow set point falling outside window 1007, when the flow set point is outside window 1007, the controls reset the flow set point to the closest edge of window 1007.

Similarly, generator 866 can operate in flow control mode with an F-ω characteristic as shown in FIG. 5 or in unit power control mode with a P-ω characteristic as shown in FIG. 4. In either case, the limits of power from generator 866 are input from coordination controller 805 to P-ω droop governor 862. With reference to FIG. 10, the range of output power, P, available from generator 866 imposes window 1007 on feeder flow, F, such that $P_{load}-P_{max}<F<P_{load}-P_{min}$, where $P_{load}$ is the load on the system, and $P_{max}$ and $P_{min}$ are the power limits of generator 866.

Figure 11A:
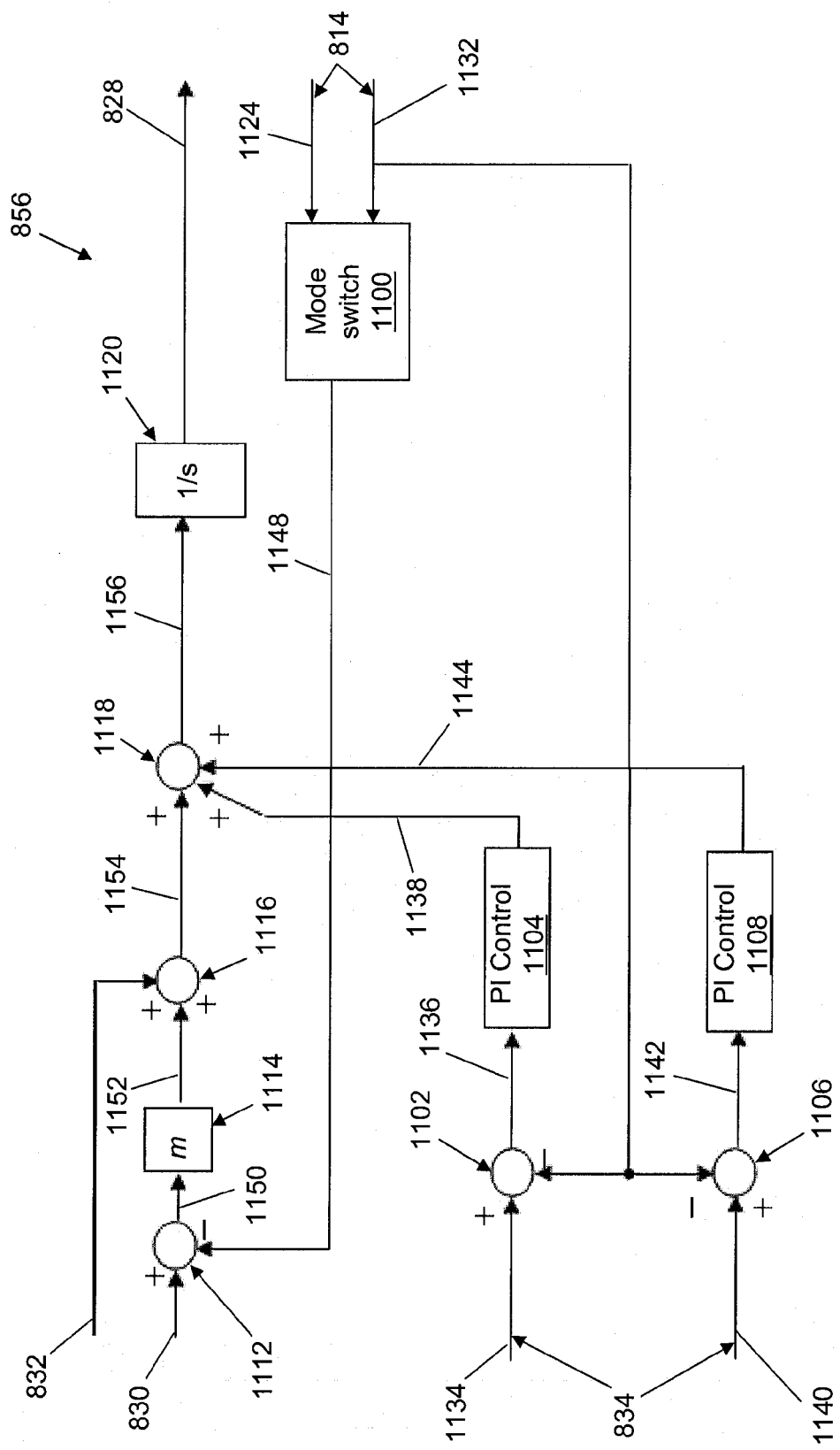
FIG. 11a is a block diagram of a P-ω droop controller of the energy storage system of FIG. 8b in accordance with an exemplary embodiment.

With reference to FIG. 11a, P-ω droop controller 856 is shown in accordance with an exemplary embodiment. P-ω droop controller 856 may include a first mode switch 1100, a first summer 1102, a first PI controller 1104, a second summer 1106, a second PI controller 1108, a third summer 1112, a multiplier 1114, a fourth summer 1116, a fifth summer 1118, and an integrator 1120. A plurality of inputs 814 from observer 807 include a storage power 1132 and a measured power flow 1124. With reference to FIGS. 8b and 11a, inputs of P-ω droop controller 856 also include storage power limits 834 from coordination controller 805, a power set point 830, and a frequency set point 832. An inverter phase angle 828 is output from P-ω droop controller 856 to inverter 852.

With reference to FIG. 11a, P-ω droop controller 856 may be used to provide zone power control or unit power control. As a result, power set point 830 may be $P_o$ or $F_o$. If unit power control is used, a power flow 1148 input to third summer 1112 is three phase power P 1132 output from observer 807 based on inverter current 809 and feeder bus voltage 910. If zone power control is used, power flow 1148 is three phase grid power flow F 1124 output from observer 807 based on feeder current 808 and feeder bus voltage 910. Mode switch 1100 determines which power parameter, three phase power P 1132 or three phase grid power flow F 1124, is input to third summer 1112. If unit power control is used, the sign of slope m in multiplier block 1114 is reversed. Three phase power P 1132 is input to first summer 1102 and second summer 1106.

Power limits 834 include a $Ps_{max}$ set point 1134 of energy storage device 858 and a $Ps_{min}$ set point 1140 of energy storage device 858. Changing the limits $Ps_{max}$ and $Ps_{min}$ controls the width of window 1007 shown with reference to FIG. 10. Coordination controller 805 controls the charge state of energy storage device 858 through the limits $Ps_{max}$ and $Ps_{min}$. First summer 1102 compares $Ps_{max}$ set point 1134 with $P_{meas}$ 1132 to calculate a first power difference 1136 input to first PI controller 1104. For example, first summer 1102 subtracts $P_{meas}$ 1132 from $Ps_{max}$ set point 1134. First PI controller 1104 controls the maximum power through a maximum frequency change 1138, $Δω_{max}$, that is limited between a minimum frequency and 0 Hz. In an exemplary embodiment, the minimum frequency is −1 Hz. Second summer 1106 compares $Ps_{min}$ set point 1140 with $P_{meas}$ 1132 to calculate a second power difference 1142 input to second PI controller 1108. For example, second summer 1106 subtracts $P_{meas}$ 1132 from $Ps_{min}$ set point 1140. Second PI controller 1108 controls the minimum power through a minimum frequency change 1144, $Δω_{min}$, that is limited between 0 Hz and a maximum frequency. In an exemplary embodiment, the maximum frequency is 1 Hz. $Δω_{max}$ and $Δω_{min}$ are scaled as radians for input to fifth summer 1118. Maximum frequency change 1138 and minimum frequency change 1144 maintain the flow set point within window 1007. In general, control parameters of the first and second PI controllers 1104, 1108 are set such that a steady state at a limit is reached in 10-20 cycles.

Third summer 1112 compares power set point 830 with power flow 1148 to calculate a third power difference 1150 input to multiplier 1114. For example, third summer 1112 subtracts power flow 1148 from power set point 830. Multiplier 1114 multiplies third power difference 1150 by the slope m to determine a frequency change 1152. Depending on the type of power control, frequency change 1152 may be defined as $m(F_o-F_{meas})$ or $-m(P_o-P_{meas})$. Fourth summer 1116 adds frequency set point 832 to frequency change 1152 to calculate an operating frequency 1154 input to fifth summer 1118. Fifth summer 1118 adds operating frequency 1154 with maximum frequency change 1138 and minimum frequency change 1144 to calculate a requested frequency 1156 input to integrator 1120. The output of the integrator 1120 is inverter phase angle 828, which is rotating in time at frequency $\omega_{req}$. Inverter phase angle 828 is reset to zero when it exceeds $2\pi$ radians. As known to those skilled in the art, energy storage system 801 can be implemented using a fewer or a greater number of elements than those depicted in FIGS. 8b, 9a, and 11a. The elements shown are merely exemplary.

Figure 11B:
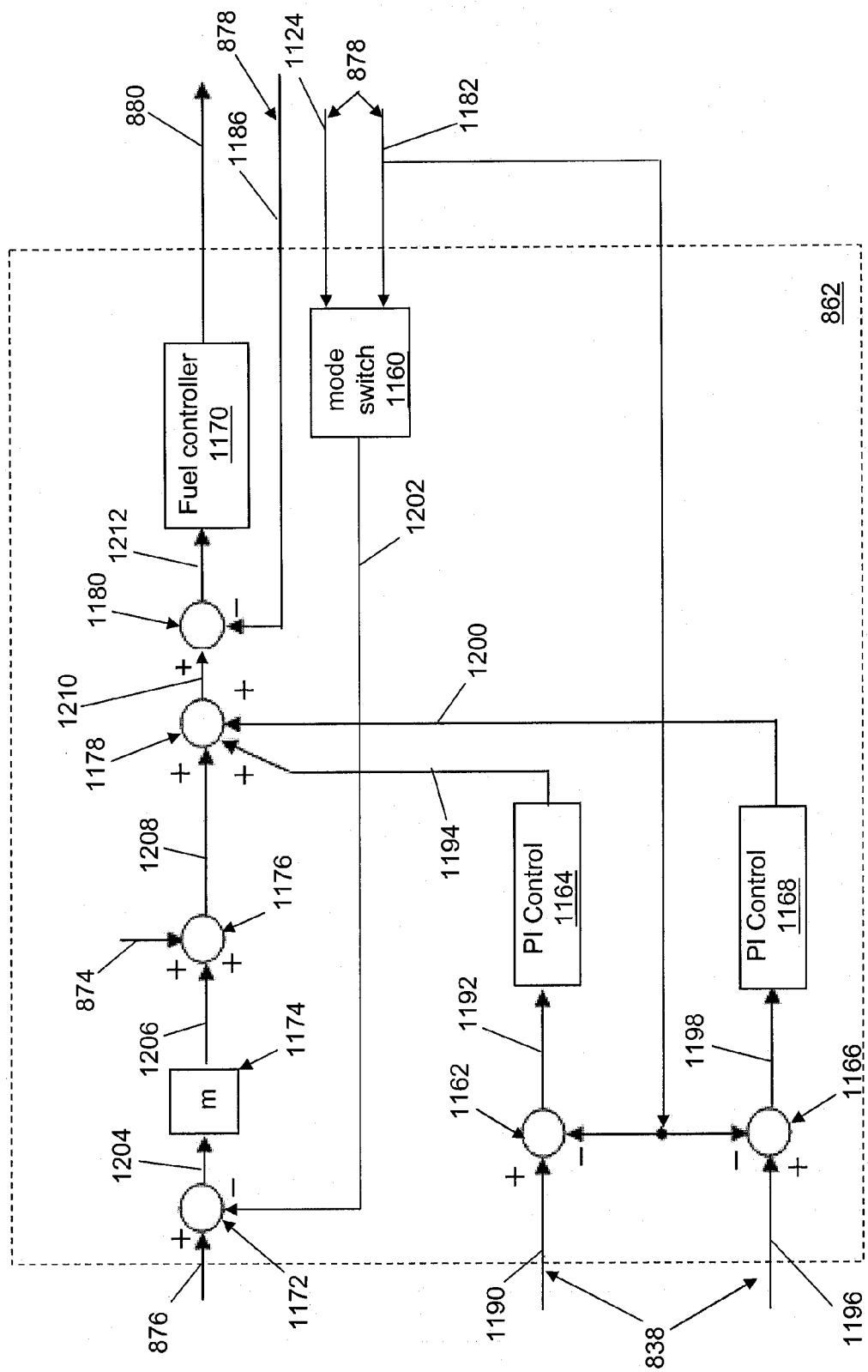
FIG. 11b is a block diagram of a P-ω droop governor of the power generation system of FIG. 8c in accordance with an exemplary embodiment.

With reference to FIG. 11b, P-ω droop governor 862 is shown in accordance with an exemplary embodiment. P-ω droop governor 862 may include a second mode switch block 1160, a first summer 1162, a third proportional PI controller 1164, a second summer 1166, a fourth PI controller 1168, a fuel controller block 1170, a third summer 1172, a second multiplier 1174, a fourth summer 1176, a fifth summer 1178, and a sixth summer 1180. A plurality of inputs 878 from observer 807 include a generator power 1182 and measured power flow 1124, and the angular velocity or revolutions per minute of the shaft, $\omega_{shaft}$ 1186 of generator 866. With reference to FIGS. 8c and 11b, inputs of P-ω droop governor 862 also include power limits 838, a power set point 876, and a frequency set point 874. A fuel command 880 is output from P-ω droop governor 862 to prime mover 864.

With reference to FIG. 11b, P-ω droop governor 862 may be used to provide zone power control or unit power control. As a result, power set point 876 may be $P_o$ or $F_o$. If unit power control is used, power flow 1202 is three phase power P 1182 output from observer 807 based on generator bus current 819 and feeder bus voltage 910. If zone power control is used, power flow 1202 is three phase grid power flow F 1124. Second mode switch 1160 determines which power parameter, three phase power P 1182 or three phase grid power flow F 1124, is input to third summer 1172 of P-ω droop governor 862. If unit power control is used, the sign of slope m in second multiplier block 1174 is reversed.

Three phase power P 1182 is input to first summer 1162 and second summer 1166 of P-ω droop governor 862. Power limits 838 include a $Pg_{max}$ set point 1190 of generator 866 and a $Pg_{min}$ set point 1196 of generator 866. Changing the limits $Pg_{max}$ and $Pg_{min}$ controls the width of window 1007 shown with reference to FIG. 10. First summer 1162 of P-ω droop governor 862 compares $Pg_{max}$ set point 1190 with three phase power P 1182 to calculate a first power difference 1192 input to third PI controller 1164. For example, first summer 1162 of P-ω droop governor 862 subtracts three phase power P 1182 from $Pg_{max}$ set point 1190 so that first power difference 1192 is negative if the $Pg_{max}$ set point 1190 is exceeded. Third PI controller 1164 controls the maximum power through a maximum frequency change 1194, $\Delta\omega_{max}$, that is limited between a minimum frequency and 0 Hz. In an exemplary embodiment, the minimum frequency is −1 Hz. Second summer 1166 of P-ω droop governor 862 compares $Pg_{min}$ set point 1196 with three phase power P 1182 to calculate a second power difference 1198 input to fourth PI controller 1168. For example, second summer 1166 of P-ω droop governor 862 subtracts three phase power P 1182 from $Pg_{min}$ set point 1196 so that first power difference 1198 is positive if the $Pg_{min}$ set point 1196 is exceeded. Fourth PI controller 1168 controls the minimum power through a minimum frequency change 1200, $\Delta\omega_{min}$, that is limited between 0 Hz and a maximum frequency. In an exemplary embodiment, the maximum frequency is 1 Hz. $\Delta\omega_{max}$ and $\Delta\omega_{min}$ are scaled as radians for input to fifth summer 1178 of P-ω droop governor 862. In general, control parameters of the third and fourth PI controllers 1164, 1168 are set such that a steady state at a limit is reached in 10-20 cycles. Maximum frequency change 1194 and minimum frequency change 1200 maintain the flow set point within window 1007.

Third summer 1112 of P-ω droop governor 862 compares power set point 876 with power flow 1202 to calculate a third power difference 1204 input to second multiplier 1174. For example, third summer 1112 of P-ω droop governor 862 subtracts power flow 1202 from power set point 876. Power set point 876 of P-ω droop governor 862 may be the same or different from power set point 830 of P-ω droop controller 856. Second multiplier 1174 multiplies third power difference 1204 by the slope m to determine a frequency change 1206. Depending on the type of power control, frequency change 1206 may be defined as $m(F_o-F)$ or $-m(P_o-P)$.

Fourth summer 1176 of P-ω droop governor 862 adds frequency set point 874 to frequency change 1206 to calculate a total frequency 1208 input to fifth summer 1178 of P-ω droop governor 862. Frequency set point 874 of P-ω droop governor 862 may be the same or different from frequency set point 832 of P-ω droop controller 856. Fifth summer 1178 of P-ω droop governor 862 adds total frequency 1208 with maximum frequency change 1194 and minimum frequency change 1200 to calculate a requested shaft speed 1210 input to sixth summer 1180 of P-ω droop governor 862. Sixth summer 1180 of P-ω droop governor 862 compares $\omega_{shaft}$ 1186 with requested shaft speed 1210 to calculate a shaft rotation error 1212 input to fuel controller 1170. For example, sixth summer 1180 of P-ω droop governor 862 subtracts $\omega_{shaft}$ 1186 from requested shaft speed 1210 to determine shaft rotation error 1212. The output of fuel controller 1170 is fuel command 880 calculated based on shaft rotation error 1212 and input to prime mover 864. In an exemplary embodiment, fuel controller 1170 is a PI controller. As known to those skilled in the art, power generation system 803 can be implemented using a fewer or a greater number of elements than those depicted in FIGS. 8c, 9b, and 11b. The elements shown are merely exemplary.

Microsource 800, which includes a combined generation and storage capability, may have six basic modes of operation denoted here as A, B, C, D, E, F. Modes A and B are normally used for "peak shaving" during the high load periods of the day. In "peak shaving", the utility provides a preset amount of load and microsource 800 provides for any excess load requirements. In contrast, in "base loading"; microsource 800 provides a preset amount of load and the utility provides for any excess load requirements. In mode A, generator 866 tracks the load and energy storage device 858 may be set to a fixed output, Ps, which is equal to or less than $Ps_{dis}$, which is the preferred discharge rate of energy storage device 858. The maximum sustained generator output is $Pg_{PM}$.

Mode B is the mirror image of mode A with energy storage device 858 tracking the load and generator 866 providing a constant output power, Pg. In the case of storage, $Ps_{max}$ may be set at the maximum rating of inverter 852. In general, generator 866 is operated at the most efficient operating point. In both modes A and B, it is assumed that energy storage device 858 has the energy necessary to operate as required in the modes.

Mode C is the expected mode used during low loads, (i.e. early morning) where the utility is providing more power than the loads needs. In this case, generator 866 is off and energy storage device 858 takes up any difference with its minimum limit set to the desired charging rate, $-Ps_{chg}$. The maximum limit is set to the maximum possible discharge rate, $Ps_{pk}$ to allow energy storage device 858 to handle a sudden load increase or loss of the utility while generator 866 comes up to help to meet the load.

Mode D is used when the feeder transfers to island operation. Limits on both generator 866 and energy storage device 858 may be relaxed to facilitate the transition. Mode E is used when the energy level of energy storage device 858 falls below a minimum reserve value, Es_min_res. Es_min_res is the minimum reserve value of energy that energy storage device 858 should have to be able to provide short-term energy to loads during islanding. Mode E is activated to hold the energy level above Es_min_res. Generator 866 is set at it's maximum power to supply loads and to charge energy storage device 858. Mode F is used when the energy level of energy storage device 858 reaches a maximum reserve value, Es_max_res. Es_max_res is the maximum reserve value of energy that energy storage device 858 should not exceed except during a brief time in island operation (Mode D). Mode F is activated to reduce the storage level of energy storage device 858 to an acceptable level.

Depending on the value of the energy in energy storage device 858, on the power allocation choice, and on the loading level of microsource 800, coordination controller 805 controls energy storage system 801 and power generation system 803 to operate in one of the six possible modes as summarized below:

| Mode | Function | $Pg_{min}$ | $Pg_{max}$ | $Ps_{min}$ | $Ps_{max}$ |
|---|---|---|---|---|---|
| A | Generator tracking load | 0 | $Pg_{PM}$ | Fixed $Ps \leq Ps_{dis}$ | |
| B | Storage tracking load | Fixed $Pg \geq 0$ | | $\geq 0$ | $Ps_{pk}$ |
| C | Charging storage from utility | Fixed $Pg = 0$ | | $-Ps_{chg}$ | $Ps_{pk}$ |
| D | Island operation | 0 | $Pg_{PM}$ | $-Ps_{pk}$ | $Ps_{pk}$ |
| E | Storage low on energy | Fixed $Pg = Pg_{PM}$ | | $-Ps_{pk}$ | $Ps_{pk}$ |
| F | Storage full | Fixed $Pg = 0$ | | 0 | $Ps_{pk}$ |

Figure 13:
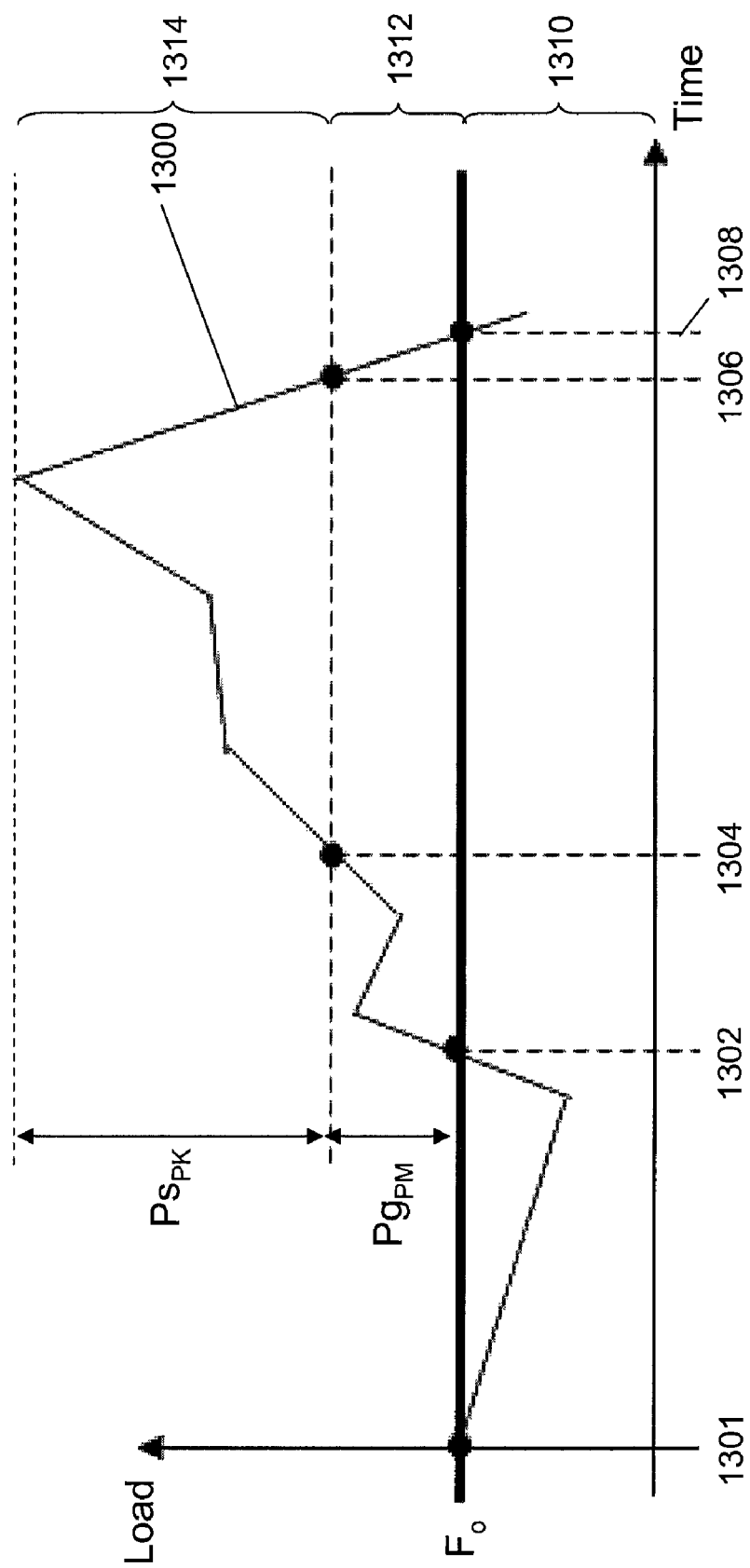
FIG. 13 is a graph of a load curve for a microsource including combined power generation and energy storage in accordance with an exemplary embodiment.

Each mode has specific triggers and rules to move to another mode. As an example, a load profile is shown with reference to FIG. 13 in accordance with an exemplary embodiment in which "peak shaving" is provided by microsource 800. FIG. 13 shows a load curve 1300, for example, covering a 24-hour period. The power provided by the utility is defined by the $F_o$ set point. For loads less than $F_o$, energy storage device 858 is charging (mode C). For loads greater than $F_o$, energy storage device 858 and generator 866 are providing power to hold the power from the utility to $F_o$. Three different load regions can be defined for which microsource 800 operates in different modes.

In a first region 1310, the load request is lower than the amount of power $F_o$ imported from the grid. For example, this condition is illustrated in the time interval between a first time 1301 and a second time 1302. In first region 1310, the power in excess of power $F_o$ is used to charge energy storage device 858 allowing the flow of power from the utility to remain constant at $F_o$. The output power of generator 866 is zero and the minimum power limit for the storage is $-Ps_{chg}$. Thus, the time interval between first time 1301 and second time 1302 results in operation in Mode C, in which, energy storage device 858 is charged from the utility, i.e., $Pg_{max}=Pg_{min}=0$; $Ps_{max}=0$; and $Ps_{min}=-Ps_{chg}$.

In a second region 1312, the load request is higher than the amount of power $F_o$ imported from the grid with the excess power required to meet the load request less than the maximum output of the generator. For example, this condition is illustrated in the time interval between second time 1302 and a third time 1304 and also between a fourth time 1306 and a fifth time 1308. In second region 1312, the load demand is higher than the power imported from the utility and the shortage of power is provided by generator 866 to allow the power from the utility to remain constant at $F_o$. The output power from energy storage device 858 is zero. Thus, the time intervals between second time 1302 and third time 1304 and between fourth time 1306 and fifth time 1308 results in operation in Mode A, in which, generator 866 tracks the load and energy storage device 858 provides a fixed output power. Thus, $Pg_{min}=0$; $Pg_{max}=Pg_{PM}$; and $Ps_{max}=Ps_{min}=0$.

In a third region 1314, the load request is higher than the amount of power $F_o$ imported from the grid with the excess power required to meet the load request greater than the maximum output of the generator, $Pg_{PM}$. For example, this condition is illustrated in the time interval between third time 1304 and fourth time 1306. In third region 1314, the load demand is larger than the sum of the flow of power coming from the grid $F_o$ and the nominal maximum power limit for generator 866 $Pg_{PM}$. Energy storage device 858 provides the excess power required to satisfy the load demands while maintaining the power coming from the grid to $F_o$. Thus, energy storage device 858 performs the load tracking function. Thus, the time interval between third time 1304 and fourth time 1306 results in operation in Mode B such that $Pg_{min}=Pg_{max}=Pg_{PM}$; $Ps_{max}=Ps_{pk}$; and $Ps_{min}=0$. Additional load profiles may be used to track load using the combined generation/storage system of microsource 800 based on different operating rules.

Figure 14A:
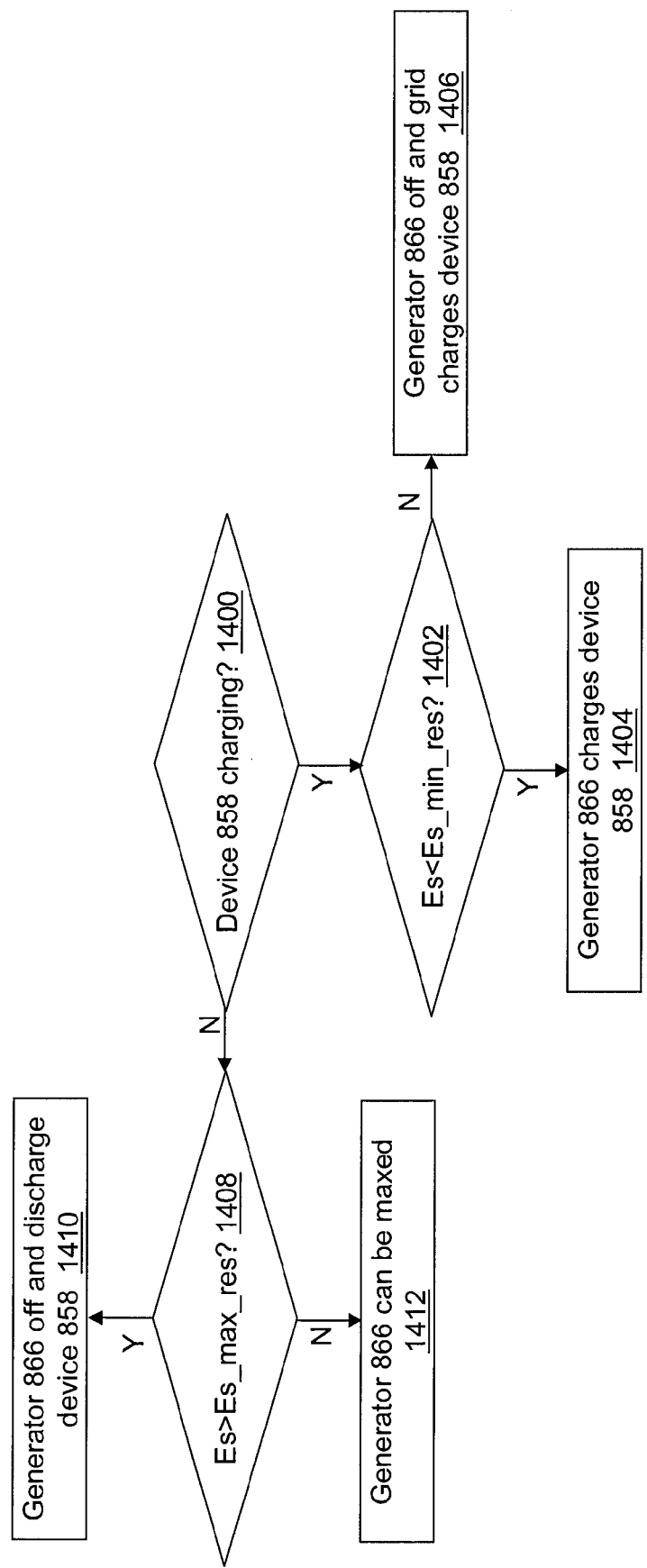
FIG. 14a-14d depict flow diagrams illustrating exemplary operations performed in combined control of both power generation and energy storage for a microsource in accordance with an exemplary embodiment.

With reference to FIG. 14a, exemplary operations performed by coordination controller 805 in determining a setting of $Pg_{max}$ are shown based on Modes A-F. In an operation 1400, a determination is made concerning whether or not energy storage device 858 is charging. If energy storage device 858 is charging, processing continues at an operation 1402. If energy storage device 858 is not charging, processing continues at an operation 1408. In operation 1402, a determination is made concerning whether or not an energy level of energy storage device 858 is less than Es_min_res. If the energy level of energy storage device 858 is less than Es_min_res, processing continues at an operation 1404. If the energy level of energy storage device 858 is not less than Es_min_res, processing continues at an operation 1406. In operation 1404, generator 866 is used to charge energy storage device 858 with $Pg_{max}=Pg_{PM}$. In operation 1406, generator 866 is switched off and the grid charges energy storage device 858 with $Pg_{max}=0$.

In operation 1408, a determination is made concerning whether or not an energy level of energy storage device 858 is greater than Es_max_res. If the energy level of energy storage device 858 is greater than Es_max_res, processing continues at an operation 1410. If the energy level of energy storage device 858 is not greater than Es_max_res, processing continues at an operation 1412. In operation 1410, generator 866 is switched off and the grid discharges energy storage device 858 with $Pg_{max}=0$. In operation 1412, generator 866 can be operated at maximum power with $Pg_{max}=Pg_{PM}$ and energy storage device 858 may be operated to provide "peak shaving".

Figure 14B:
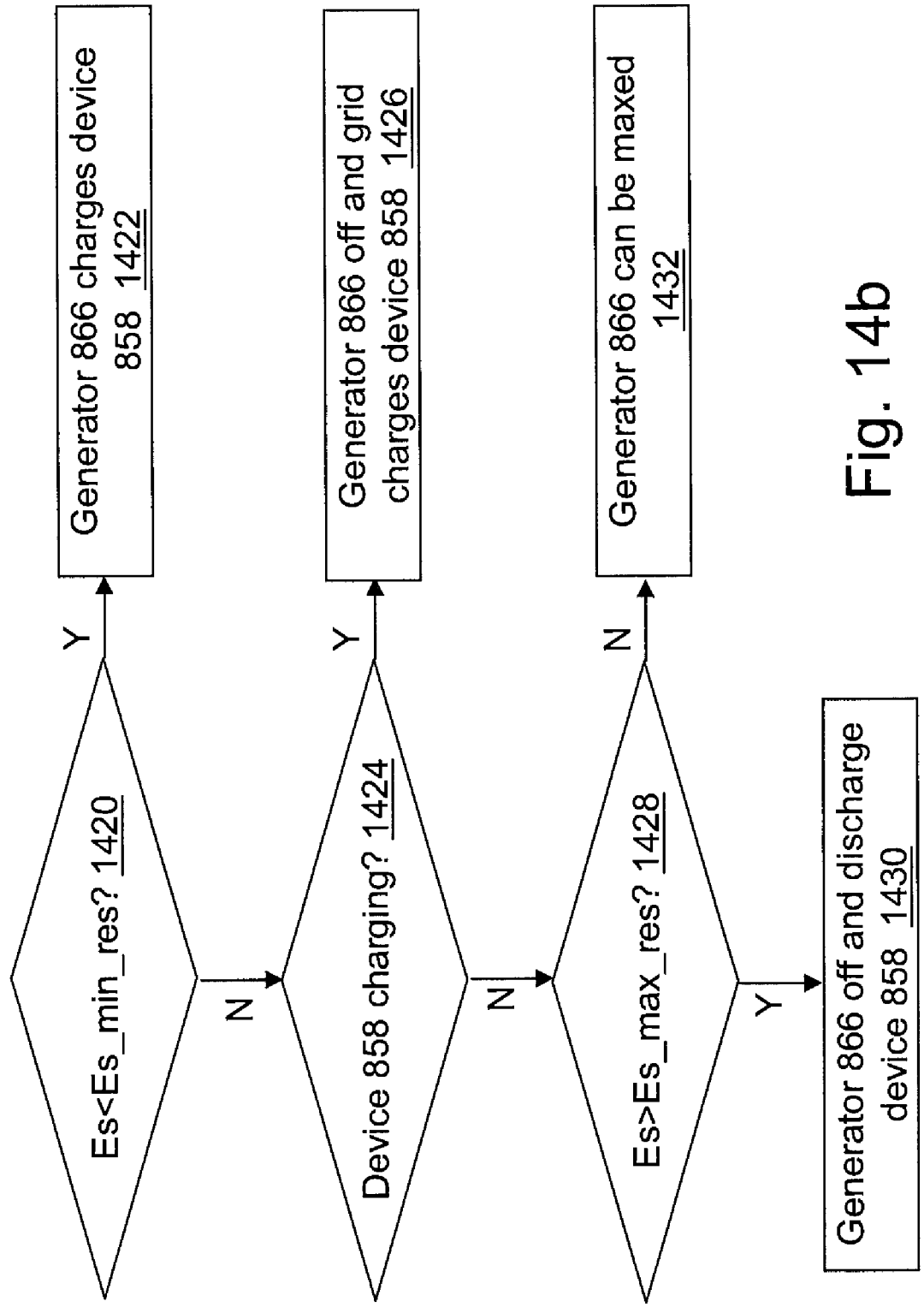

With reference to FIG. 14b, exemplary operations performed by coordination controller 805 in determining a setting of $Pg_{min}$ are shown. In operation 1420, a determination is made concerning whether or not an energy level of energy storage device 858 is less than Es_min_res. If the energy level of energy storage device 858 is less than Es_min_res, processing continues at an operation 1422. If the energy level of energy storage device 858 is not less than Es_min_res, processing continues at an operation 1424. In operation 1422, generator 866 is used to charge energy storage device 858 with $Pg_{min}=Pg_{PM}$. In operation 1424, a determination is made concerning whether or not energy storage device 858 is charging. If energy storage device 858 is charging, processing continues at an operation 1426. If energy storage device 858 is not charging, processing continues at an operation 1428. In operation 1426, generator 866 is switched off and the grid charges energy storage device 858 with $Pg_{min}=0$.

In operation 1428, a determination is made concerning whether or not an energy level of energy storage device 858 is greater than Es_max_res. If the energy level of energy storage device 858 is greater than Es_max_res, processing continues at an operation 1430. If the energy level of energy storage device 858 is not greater than Es_max_res, processing continues at an operation 1432. In operation 1430, generator 866 is switched off and the grid discharges energy storage device 858 with $Pg_{min}=0$. In operation 1432, generator 866 can be operated at maximum power with $Pg_{min}=Pg_{PM}$ and energy storage device 858 may be operated to provide "peak shaving".

Figure 14C:
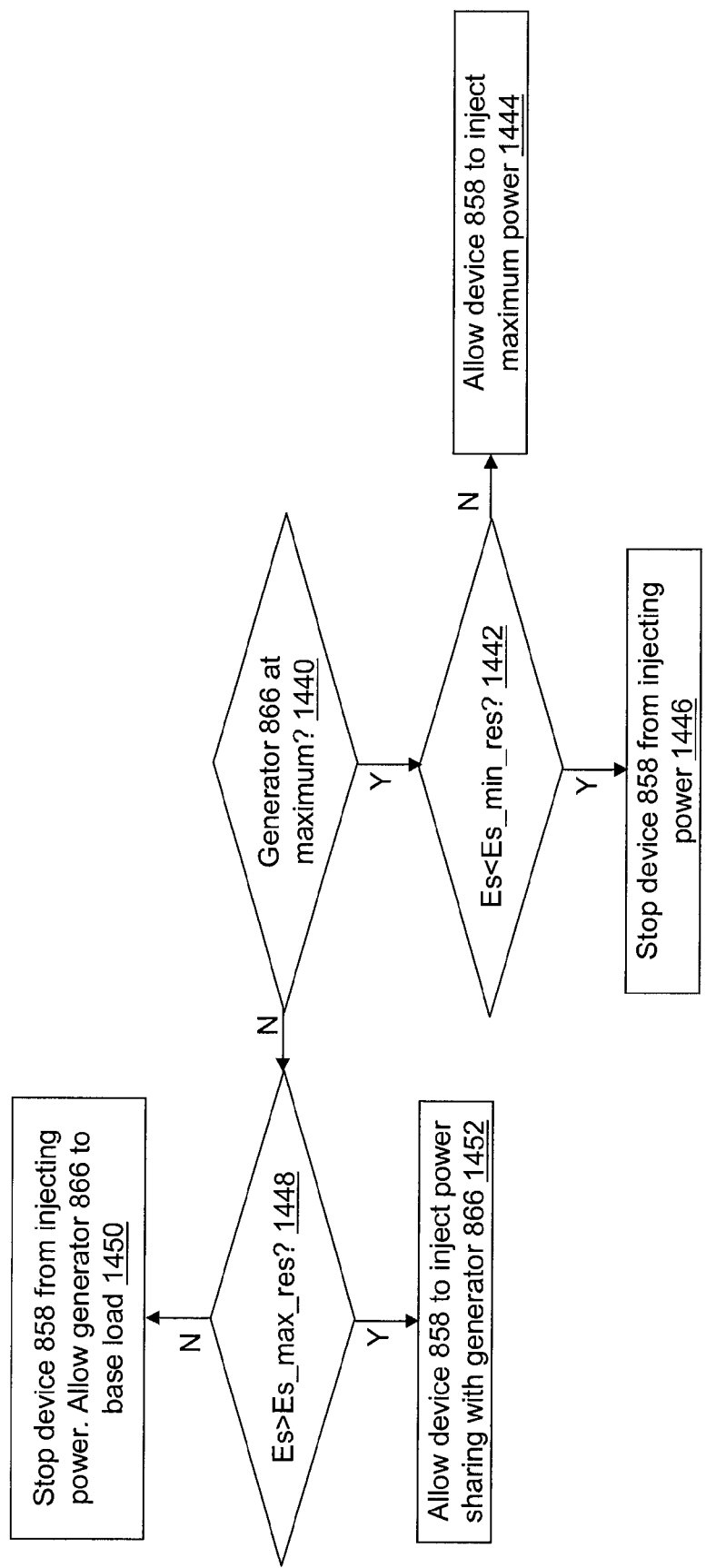

With reference to FIG. 14c, exemplary operations performed by coordination controller 805 in determining a setting of $Ps_{max}$ are shown. In operation 1440, a determination is made concerning whether or not generator 866 is providing a maximum power, $Pg_{PM}$. If generator 866 is providing a maximum power $Pg_{PM}$, processing continues at an operation 1442. If generator 866 is not providing a maximum power, $Pg_{PM}$, processing continues at an operation 1448. In operation 1442, a determination is made concerning whether or not an energy level of energy storage device 858 is less than Es_min_res. If the energy level of energy storage device 858 is less than Es_min_res, processing continues at an operation 1446. If the energy level of energy storage device 858 is not less than Es_min_res, processing continues at an operation 1444. In operation 1444, energy storage device 858 is allowed to inject maximum power with $Ps_{max}=Ps_{pk}$ to support "peak shaving". In operation 1446, energy storage device 858 is not allowed to inject power and $Ps_{max}=0$.

In operation 1448, a determination is made concerning whether or not an energy level of energy storage device 858 is greater than Es_max_res. If the energy level of energy storage device 858 is greater than Es_max_res, processing continues at an operation 1452. If the energy level of energy storage device 858 is not greater than Es_max_res, processing continues at an operation 1450. In operation 1450, generator 866 is controlled to provide "base loading" and energy storage device 858 is not allowed to inject power and $Ps_{max}=0$. In operation 1452, energy storage device 858 injects power with $Ps_{max}=Ps_{min}=$fixed $Ps \leq Ps_{dis}$ such that generator 866 and energy storage device 858 share the load requirements.

Figure 14D:
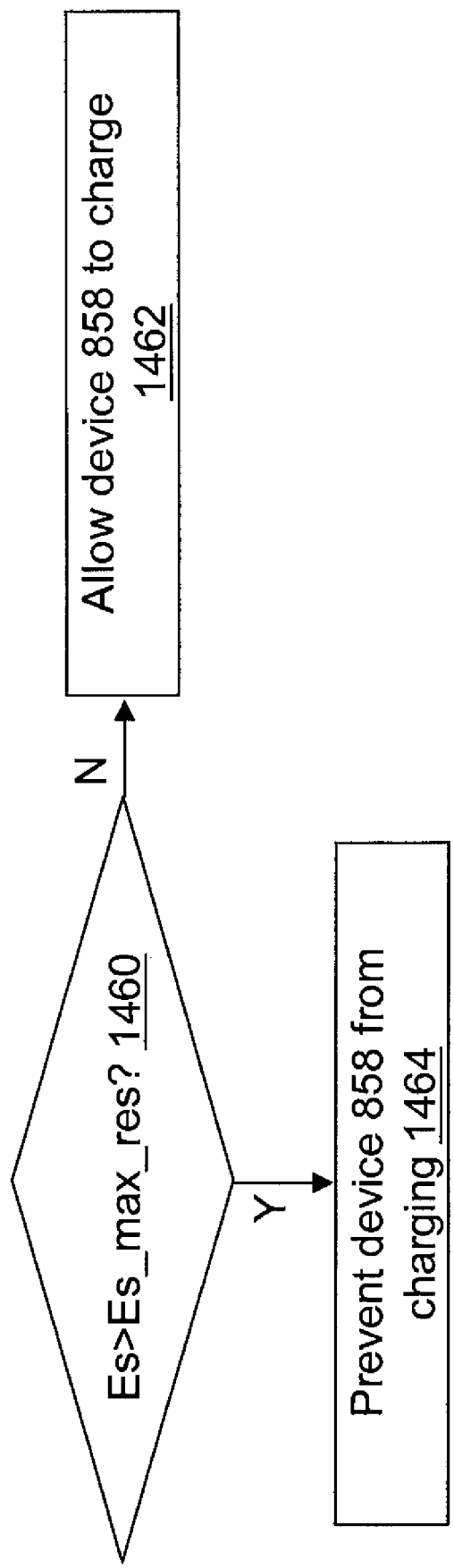

With reference to FIG. 14d, exemplary operations performed by coordination controller 805 in determining a setting of $Ps_{min}$ are shown. In operation 1460, a determination is made concerning whether or not an energy level of energy storage device 858 is greater than Es_max_res. If the energy level of energy storage device 858 is greater than Es_max_res, processing continues at an operation 1464. If the energy level of energy storage device 858 is not greater than Es_max_res, processing continues at an operation 1462. In operation 1462, energy storage device 858 is allowed to charge with $Ps_{min}=-Ps_{chg}$. In operation 1464, energy storage device 858 is prevented from charging such that $Ps_{min}=0$.

Figure 15:
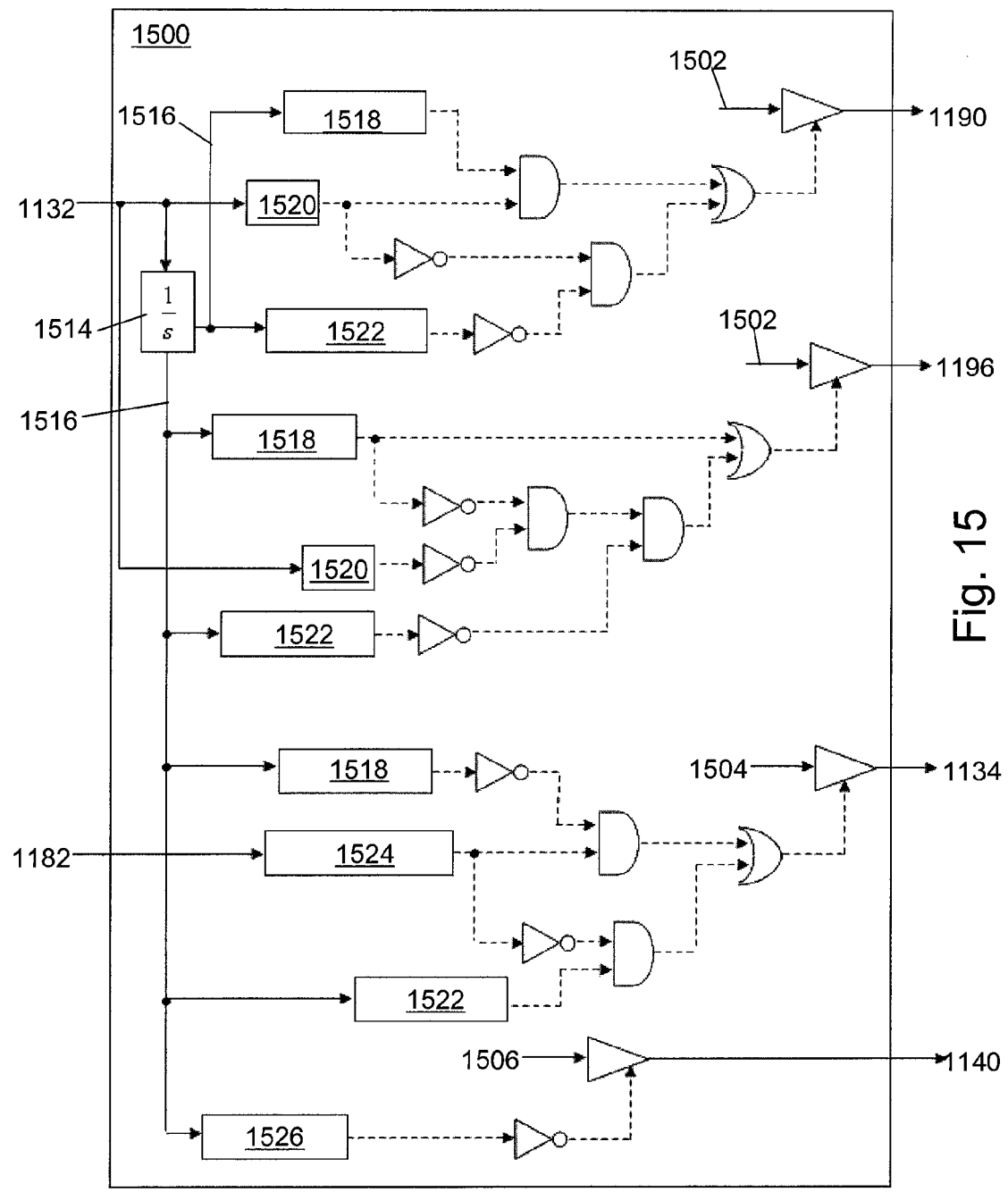
FIG. 15 is a schematic diagram of a logic design circuit for the combined power generation and energy storage system of FIGS. 14a-14d in accordance with an exemplary embodiment.

With reference to FIG. 15, a logic design 1500 for coordination controller 805 is shown in accordance with an exemplary embodiment. Logic design 1500 includes Ps 1132, $Pg_{max}$ 1502, Pg 1182, $Ps_{pk}$ 1504, and $-Ps_{pk}$ 1506 as inputs and $Pg_{max}$ 1190, $Pg_{min}$ 1196, $Ps_{max}$ 1134, $Ps_{min}$ 1140 as outputs. Ps 1132 is provided as an input to integrator 1514 to form an integrated Ps 1516. Ps 1132 is input to a first block 1520 which determines if Ps<0. Pg 1504 is input to a second block 1524 which determines if $Pg=Pg_{max}$. Integrated Ps 1516 or Es is input to a third block 1518 which determines if Es<Es_min_res. Es is also input to a fourth block 1522 which determines if Es>Es_max_res. Es is input to a fifth block 1526 which determines if Es=Es_max_res. Logic design 1500 is further comprised of inverters, non-inverting amplifiers, AND gates, and OR gates which provided the functionality discussed with reference to FIGS. 14a-14d in setting $Pg_{max}$ 1190, $Pg_{min}$ 1196, $Ps_{max}$ 1134, $Ps_{min}$ 1140.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A controller for controlling an energy storage device and a power generation device used in a distributed energy resource, the controller comprising circuitry:
    to determine a mode of operation for an energy storage device and a power generation device based on an energy level of the energy storage device and on a load to which the energy storage device and the power generation device are operably coupled for power transfer;
    to determine a first minimum power set point and a first maximum power set point for the energy storage device based on the determined mode of operation and on a storage output power, wherein the storage output power is measured at a first power bus operably coupled to the energy storage device;
    to determine a second minimum power set point and a second maximum power set point for the power generation device based on the determined mode of operation and on a generation output power, wherein the generation output power is measured at a second power bus operably coupled to the power generation device;
    to control a first output power of the energy storage device based on the determined first minimum power set point and the determined first maximum power set point; and
    to control a second output power of the power generation device based on the determined second minimum power set point and the determined second maximum power set point.

2. The controller of claim 1, wherein controlling the first output power of the energy storage device comprises:
    calculating a maximum frequency change for an inverter coupled with the energy storage device based on a first comparison between the determined first maximum power set point and the storage output power;

calculating a minimum frequency change for the inverter based on a second comparison between the determined first minimum power set point and the storage output power;

calculating an operating frequency for the inverter based on a third comparison between a power set point and a measured power flow;

calculating a requested frequency for the inverter by combining the calculated maximum frequency change, the calculated minimum frequency change, and the calculated operating frequency; and integrating the calculated requested frequency to determine a phase angle of a voltage of the inverter to control the first output power.

3. The controller of claim 2, wherein the measured power flow is the storage output power.

4. The controller of claim 2, further comprising regulating an output voltage of the inverter using a voltage versus reactive power droop controller.

5. The controller of claim 1, wherein controlling the second output power of the power generation comprises:

calculating a maximum frequency change for the power generation device based on the determined second maximum power set point and the generation output power;

calculating a minimum frequency change for the power generation device based on the determined second minimum power set point and the generation output power;

calculating an operating frequency for the power generation device based on a third comparison between a power set point and a measured power flow;

calculating a requested shaft speed for the power generation device by combining the calculated maximum frequency change, the calculated minimum frequency change, and the calculated operating frequency;

calculating a shaft speed adjustment for the power generation device based on a fourth comparison between the calculated requested shaft speed and a measured shaft speed of the power generation device;

calculating a fuel command for the power generation device based on the calculated shaft speed adjustment; and adjusting a rotation rate of a shaft of the power generation device based on the calculated fuel command to control the second output power.

6. The controller of claim 5, wherein the measured power flow is the generation output power.

7. The controller of claim 5, further comprising regulating an output voltage of the power generation device using a voltage versus reactive power droop controller.

8. The controller of claim 1, wherein in a first mode of operation, the determined first minimum power set point is a constant power level, the determined first maximum power set point is the constant power level, the determined second minimum power set point is approximately zero, and the second maximum power set point is determined to provide an excess power level required by the load.

9. The controller of claim 8, wherein the constant power level is a preferred discharge rate of the energy storage device.

10. The controller of claim 1, wherein in a first mode of operation, the determined second minimum power set point is a constant power level, the determined second maximum power set point is the constant power level, the determined first maximum power set point is a maximum discharge rate of the energy storage device, and the first minimum power set point is determined to provide an excess power level required by the load.

11. The controller of claim 1, wherein in a first mode of operation, the determined first minimum power set point is a charge rate of the energy storage device and the determined first maximum power set point is a maximum discharge rate of the energy storage device.

12. The controller of claim 11, wherein the determined second minimum power set point is approximately zero, the determined second maximum power set point is approximately zero, and further wherein the power transfer charges the energy storage device.

13. The controller of claim 1, wherein in a first mode of operation, the determined first minimum power set point is a maximum charge rate of the energy storage device, the determined first maximum power set point is a maximum discharge rate of the energy storage device, the determined second minimum power set point is approximately zero, and the determined second maximum power set point is a maximum sustained power output of the power generation device.

14. The controller of claim 13, wherein the power transfer is zero.

15. The controller of claim 1, wherein the energy level of the energy storage device is below a minimum reserve value, and further wherein the determined second minimum power set point is a maximum sustained power output of the power generation device, the determined second maximum power set point is the maximum sustained power output of the power generation device, and the second output power of the power generation device charges the energy storage device.

16. The controller of claim 15, wherein the determined first minimum power set point is a maximum charge rate of the energy storage device, and the determined first maximum power set point is a maximum discharge rate of the energy storage device.

17. The controller of claim 1, wherein the energy level of the energy storage device is above a maximum reserve value, and further wherein the determined second minimum power set point is approximately zero, the determined second maximum power set point is approximately zero, the determined first minimum power set point is approximately zero, and the determined first maximum power set point is a maximum discharge rate of the energy storage device.

18. A method of controlling an energy storage device and a power generation device used in a distributed energy resource, the method comprising:

determining a mode of operation for an energy storage device and a power generation device based on an energy level of the energy storage device and on a load to which the energy storage device and the power generation device are operably coupled for power transfer;

determining a first minimum power set point and a first maximum power set point for the energy storage device based on the determined mode of operation and on a storage output power, wherein the storage output power is measured at a first power bus operably coupled to the energy storage device;

determining a second minimum power set point and a second maximum power set point for the power generation device based on the determined mode of operation and on a generation output power, wherein the generation output power is measured at a second power bus operably coupled to the power generation device;

controlling a first output power of the energy storage device based on the determined first minimum power set point and the determined first maximum power set point; and controlling a second output power of the power generation device based on the determined second minimum power set point and the determined second maximum power set point.

19. A microsource, the microsource comprising:
an energy storage device operably coupled for power transfer to a load through a first power bus;
a power generation device operably coupled for power transfer to the load through a second power bus; and
a controller operably coupled with the energy storage device and the power generation device, the controller including circuitry
   to determine a mode of operation for the energy storage device and the power generation device based on an energy level of the energy storage device and on the load;
   to determine a first minimum power set point and a first maximum power set point for the energy storage device based on the determined mode of operation and on a storage output power measured at the first power bus;
   to determine a second minimum power set point and a second maximum power set point for the power generation device based on the determined mode of operation and on a generation output power measured at the second power bus;
   to control a first output power of the energy storage device based on the determined first minimum power set point and the determined first maximum power set point; and
   to control a second output power of the power generation device based on the determined second minimum power set point and the determined second maximum power set point.

* * * * *

UNITED STATES PATENT AND TRADEMARK OFFICE
CERTIFICATE OF CORRECTION

PATENT NO. : 7,920,942 B2  
APPLICATION NO. : 11/681017  
DATED : April 5, 2011  
INVENTOR(S) : Robert H. Lasseter et al.

Page 1 of 1

It is certified that error appears in the above-identified patent and that said Letters Patent is hereby corrected as shown below:

IN THE SPECIFICATION at Col. 1; lines 7-11, please delete the paragraph reciting "This invention was made with United States government support awarded by the following agencies: National Science Foundation, Electrical & Communications System Div., Award No. 0078522. The United States government has certain rights in this invention."

under the header REFERENCE TO GOVERNMENT RIGHTS and replace with the following rewritten paragraph:

--This invention was made with government support under DE-AC03-76SF00098 awarded by the US Department of Energy. The government has certain rights in the invention.--

Signed and Sealed this  
Twenty-fourth Day of May, 2011

David J. Kappos  
*Director of the United States Patent and Trademark Office*